(12) United States Patent
Nishio

(10) Patent No.: US 11,697,164 B2
(45) Date of Patent: Jul. 11, 2023

(54) MOLD MACHINING METHOD USING END MILL

(71) Applicant: NALUX CO., LTD., Osaka (JP)

(72) Inventor: Yukinobu Nishio, Osaka (JP)

(73) Assignee: NALUX CO., LTD., Osaka (JP)

( * ) Notice: Subject to any disclaimer, the term of this patent is extended or adjusted under 35 U.S.C. 154(b) by 623 days.

(21) Appl. No.: 16/784,846

(22) Filed: Feb. 7, 2020

(65) Prior Publication Data

US 2020/0171586 A1 Jun. 4, 2020

Related U.S. Application Data

(63) Continuation of application No. PCT/JP2017/030324, filed on Aug. 24, 2017.

(51) Int. Cl.
*B23C 3/20* (2006.01)
*B23C 3/02* (2006.01)
(Continued)

(52) U.S. Cl.
CPC .................. *B23C 3/20* (2013.01); *B23C 3/02* (2013.01); *B23C 2220/52* (2013.01);
(Continued)

(58) Field of Classification Search
CPC ......... B23C 3/20; B23C 3/02; B23C 2220/52; B23C 2265/40; Y10T 409/30756;
(Continued)

(56) References Cited

U.S. PATENT DOCUMENTS

| | | | |
|---|---|---|---|
| 5,087,159 A | 2/1992 | Thomas | |
| 5,378,091 A | * 1/1995 | Nakamura | ......... B23Q 11/1023 |
| | | | 407/53 |

(Continued)

FOREIGN PATENT DOCUMENTS

| | | |
|---|---|---|
| EP | 1 925 397 A1 | 5/2008 |
| JP | 62-176709 A | 8/1987 |

(Continued)

OTHER PUBLICATIONS

Textbook titled "Geometry", by Jurgensen et al., 2011 impression, pp. 248-249.*

(Continued)

*Primary Examiner* — Erica E Cadugan
(74) *Attorney, Agent, or Firm* — Squire Patton Boggs (US) LLP

(57) ABSTRACT

A mold machining method using an endmill, the contour of a cross section of the mold being concave and continuous in an area, a ratio of the maximum to the minimum of radius of curvature of the contour of a portion of the area (a first area) being 2 or greater, and a blade of the endmill having a second area where the contour of a cross section is similar to the contour of the first area, the method comprising the steps of determining a spiral path of the endmill such that each point of the first area is machined by a portion of the second area, corresponding to said each point in the similarity, and a radial interval between the spiral tool path is maximized while keeping surface roughness of the machined mold at or below a predetermined value; and machining the mold along the path.

5 Claims, 15 Drawing Sheets

(51) Int. Cl.
    *B23C 5/10* (2006.01)
    *B23C 5/14* (2006.01)
(52) U.S. Cl.
    CPC ... *B23C 2270/18* (2013.01); *Y10T 409/30756* (2015.01); *Y10T 409/303808* (2015.01); *Y10T 409/304424* (2015.01); *Y10T 409/307616* (2015.01)
(58) Field of Classification Search
    CPC . Y10T 409/303752; Y10T 409/303808; Y10T 409/30084; Y10T 409/300896
    USPC .............................. 409/199, 131–132, 79–80
    See application file for complete search history.

(56) References Cited

U.S. PATENT DOCUMENTS

| | | | |
|---|---|---|---|
| 6,684,742 B1 | 2/2004 | White | |
| 6,840,722 B1* | 1/2005 | Nonaka | B23Q 1/5468 82/1.11 |
| 7,287,939 B2* | 10/2007 | Koch | G05B 19/40937 409/199 |
| 2003/0127759 A1* | 7/2003 | Border | B29D 11/00278 264/2.5 |
| 2006/0253220 A1* | 11/2006 | McPherson | B24B 49/00 700/177 |
| 2007/0245799 A1* | 10/2007 | Asakawa | B21K 5/20 72/356 |
| 2008/0121078 A1 | 5/2008 | Kunimatsu et al. | |
| 2011/0027032 A1* | 2/2011 | Keller | B24B 13/046 409/219 |
| 2013/0236262 A1* | 9/2013 | Hon | G05B 19/401 409/132 |

FOREIGN PATENT DOCUMENTS

| | | | |
|---|---|---|---|
| JP | 08-252713 A | | 10/1996 |
| JP | 11-156616 A | * | 6/1999 |
| JP | 2005-199421 A | | 7/2005 |
| JP | 2008-126391 A | | 6/2008 |
| JP | 2012-101291 A | | 5/2012 |
| WO | WO 2013/076809 A1 | | 5/2013 |
| WO | WO-2014/016397 A1 | * | 1/2014 |
| WO | WO 2015/068566 A1 | | 5/2015 |
| WO | WO-2022/181674 A1 | * | 9/2022 |

OTHER PUBLICATIONS

Article "Similarity (geomtery)", from Wikipedia, retrieved on Feb. 21, 2023 from https://en.wikipedia.org/wiki/Similarity_(geometry), 11 pages.*

Textbook titled "Geometry A High School Course", by Lang et al., copyright 1983, Chapters, pp. 259-323, printed by Springer Science+ Business Media, LLC.*

Machine Translation JP 2012-101291 A, which JP '291 was published May 2012.*

Article "What is Geometric Similarity?", author unknown, downloaded from https:www.https://www.intmath.com/functions-and-graphs/what-is-geometric-similarity.php on Feb. 21, 2023, three pages.*

International Search Report and Written Opinion dated Oct. 17, 2017 corresponding to International Patent Application No. PCT/JP2017/030324.

* cited by examiner

A-A CROSS SECTION

MOLD MACHINING METHOD USING END MILL

TECHNICAL FIELD

The present invention relates to a method for machining a mold using an end mill.

BACKGROUND ART

A method for machining a mold for a lens surface using a milling machine is generally known (Patent document 1, for example).

When a work that is substantially axially symmetric such as a mold for a lens surface is machined with a milling machine, a machining method in which an end mill is moved along a spiral path from the outer side toward the symmetric axis of the work is employed. Such a machining method is referred to as a spiral tool path machining.

When a mold is subjected to a spiral tool path machining using a ball end mill, a radius of curvature of the contour of a blade of the ball end mill is restricted by the minimum radius of curvature of a cross section of a mold to be machined, and an interval in the radial direction between the tool path, i.e. a pitch of the spiral tool path is restricted in order to keep surface roughness of the machined mold at or below a predetermined value. On the other hand, machining efficiency of a spiral tool path machining is substantially determined by the pitch. Accordingly, machining efficiency of a spiral tool path machining with a ball end mill is restricted by the minimum radius of curvature of a cross section of a mold to be machined in order to keep surface roughness of the machined mold at or below a predetermined value.

On the other hand, a value of surface roughness required for a mold for a lens surface is very small and is 0.003 micrometers, for example. Further, in many cases, the radius of curvature of a lens surface remarkably varies depending on distance from the central axis of the lens. When a mold for such a lens surface is machined with a ball end mill, machining efficiency is restricted by the minimum radius of curvature of a cross section of the lens surface.

Thus, a method for machining a mold using an end mill, with which machining efficiency can be improved while keeping surface roughness of the machined mold at or below a predetermined value has not been developed.

PRIOR ART DOCUMENT

Patent Document

Patent document 1: JP2008126391A

Accordingly, there is a need for a method for machining a mold using an end mill, with which machining efficiency can be improved while keeping surface roughness of the machined mold at or below a predetermined value.

SUMMARY OF THE INVENTION

In an example of a mold machining method using an end mill according to the present invention, the mold has an area in which the contour of a cross section containing the central axis of the mold is concave and continuous, a portion of the area is referred to a first area, a ratio of the maximum value to the minimum value of radius of curvature of the contour of the first area is 2 or greater, and a blade of the end mill has a second area in which the contour of a cross section containing the central axis of the end mill is similar in shape to the contour of the first area. The method includes the steps of determining a spiral path of the end mill such that each point on the contour of the first area is machined by a portion of the second area, the portion corresponding to said each point in the similarity, and an interval in the radial direction between the spiral tool path is maximized while keeping surface roughness of the machined mold at or below a predetermined value; and machining the mold with the end mill along the path In the case of a conventional ball end mill, the whole surface of a mold is machined with a blade that has the contour of a cross section containing the central axis, a radius of curvature of the contour corresponding to the minimum value of radius of curvature of the contour of a cross section containing the central axis of the mold. On the other hand, in the present invention, a machining portion of a blade is changed such that a radius of curvature of the contour of a cross section containing the central axis of the portion of the blade changes depending on a radius of curvature of the contour of a cross section containing the central axis of the mold. Accordingly, machining efficiency that is restricted by a radius of curvature of the contour of a cross section containing the central axis of the blade can be made greater than in the case of a conventional ball end mill.

In the mold machining method using an end mill according to the first embodiment of the present invention, the mold is axially symmetric with respect to the central axis.

According to the present embodiment, a spiral path of the end mill can easily be determined by determining an interval in the radial direction between machining path in a cross section containing the central axis of the mold according to a predetermined target value of surface roughness of the machined mold.

In the mold machining method using an end mill according to the second embodiment of the present invention, a ratio of similarity of the contour of the second area to the contour of the first area is 70 to 85%.

In the mold machining method using an end mill according to the third embodiment of the present invention, a ratio of contour length of the first area to contour length of an area corresponding to an optical surface of a lens manufactured by the mold is 50% or greater.

In the mold machining method using an end mill according to the fourth embodiment of the present invention, when a z-axis is defined to agree with the central axis of the mold and an x-axis and a y-axis that are orthogonal to each other are defined to be orthogonal to the z-axis, the y-axis can be selected such that in any cross section perpendicular to the y-axis the contour of the mold is line-symmetric with respect to the z-axis, a radius of curvature at any point, a first point in the area of $$y \leq 0$$

or in the area of $$0 \leq y$$

on the contour of the y-z cross section of the mold is smaller than a radius of curvature at a point, a second point on the contour of any cross section containing the central axis (z-axis), an angle formed by the tangential line at the first point and a plane perpendicular to the z-axis being equal to an angle formed by the tangential line at the second point and a plane perpendicular to the z-axis, and when the end mill is located such that the central axis of the end mill passes through the normal to the surface of the mold at a point to be machined, the surface of the mold and the surface of the end mill do not have a point of contact besides the point to be machined.

In the mold machining method using an end mill according to the fifth embodiment of the present invention, a value of curvature of radius of the contour of the second area is determined such that the value does not exceed 2.5 millimeters.

In the mold machining method using an end mill according to the sixth embodiment of the present invention, the mold is used for an optical element.

DESCRIPTION OF EMBODIMENTS

Figure 1:
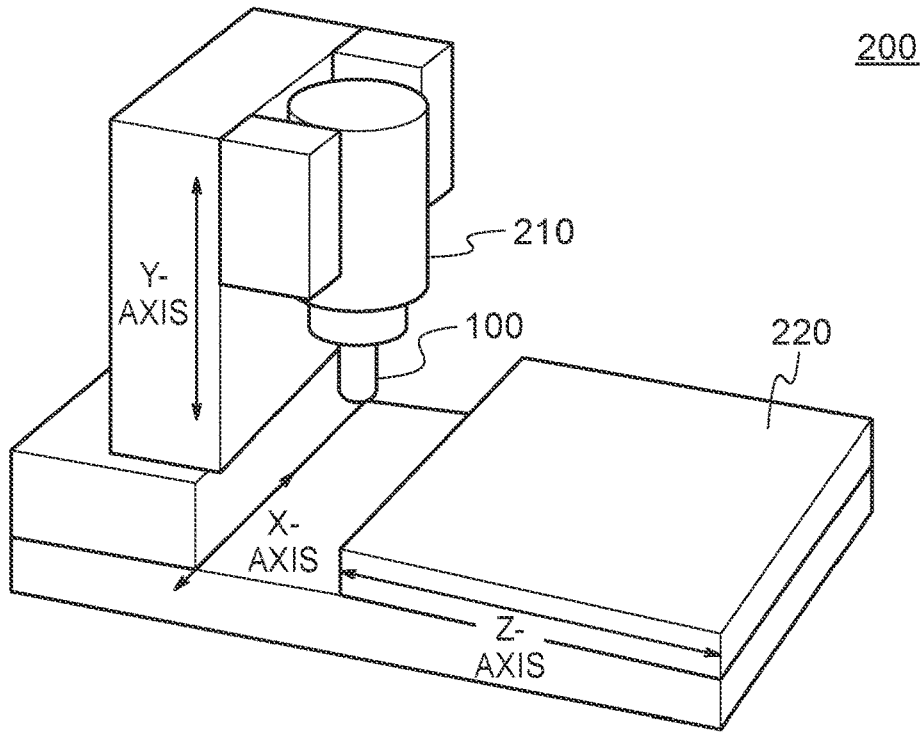
FIG. 1 shows a three-dimensional machine for milling.

FIG. 1 shows a three-dimensional machine 200 for milling. An end mill 100 is fixed to an end mill mount 210, and a work to be machined is fixed to a work mount 220. The end mill mount 210 is capable of moving in an x-axis direction and in a z-axis direction, and the work mount 220 is capable of moving in a y-axis direction. The work fixed to the work mount 220 is machined by making the end mill rotate around the central axis set in the z-axis direction and making the end mill mount 210 and the work mount 220 move. The central axis of the end mill means the axis of rotation of the end mill.

Figure 2A:
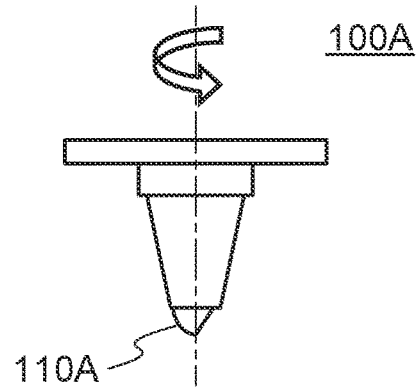
FIG. 2A shows a conventional ball end mill.

FIG. 2A shows a conventional ball end mill 100A. A cutting blade 110A of the ball end mill 100A is spherical. A cutting blade is hereinafter also referred to merely as a blade. In FIG. 2A, the central axis of the ball end mill 100A is represented by a chain line.

Figure 2B:
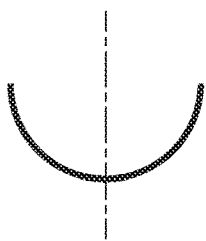
FIG. 2B shows a space that the cutting blade occupies when the ball end mill is rotated.

FIG. 2B shows a space that the cutting blade 110A occupies when the ball end mill 100A is rotated. FIG. 2B is a cross section containing the central axis of the ball end mill 100A. In FIG. 2B, the central axis of the ball end mill 100A is represented by a chain line.

When a work that is substantially axially symmetric such as a mold for a lens surface is machined with a milling machine, a machining method in which an end mill is moved along a spiral path from the outer side toward the symmetric axis of the work is employed. In this machining method, a path of a tool, that is a tool path is substantially axially symmetric, and does not have an apex, that is a point of discontinuity of a first-order derivative in the whole area of the path. The method is advantageous when an axially symmetric and smooth surface is machined. A time period between the point when a portion is machined and the point of start of machining is a function of distance between the portion and the axially symmetric axis, and an error resulting from the time period is generated in an axially symmetric way. The above-described machining method is referred to as a spiral tool path machining.

Figure 3:
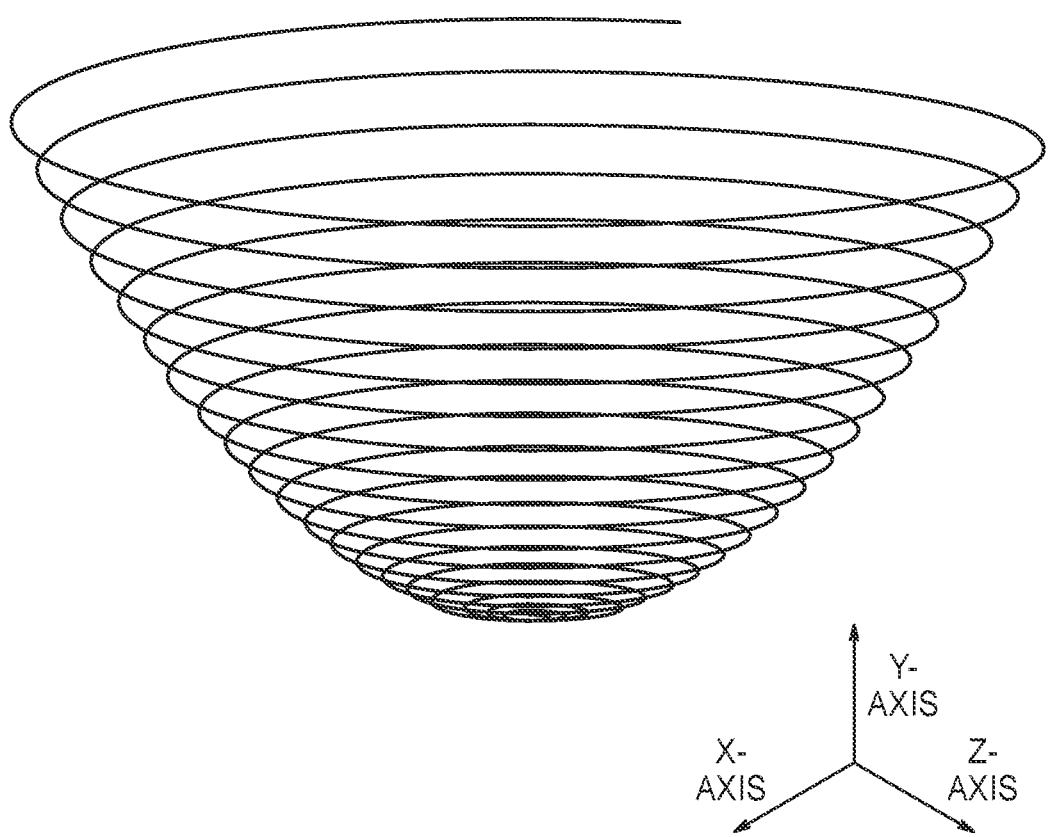
FIG. 3 shows a tool-path on a work of a spiral tool path machining.

FIG. 3 shows a tool path on a work of a spiral tool path machining.

When a mold for a lens surface is machined with an end mill, surface roughness on the lens surface resulting from the machining must be kept at or below a predetermined value. For the case that a mold for a lens surface is machined with a ball end mill, a theoretical value of surface roughness of a mold resulting from a spiral tool path machining will be studied below.

Figure 4:
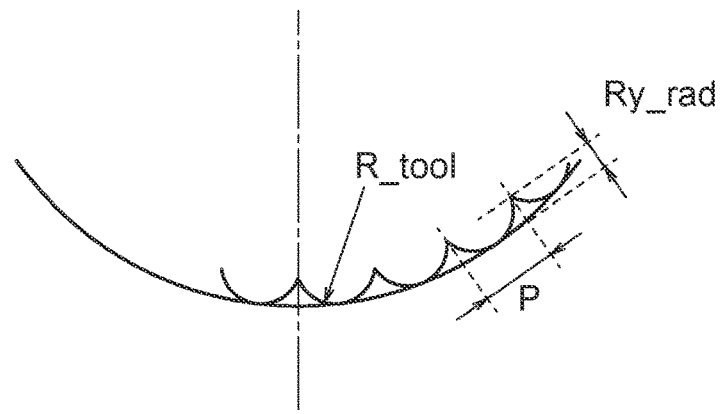
FIG. 4 illustrates a theoretical value of surface roughness of a mold in a cross section containing the symmetric axis of the mold.

FIG. 4 illustrates a theoretical value of surface roughness of an axially symmetric mold in a cross section containing the symmetric axis of the mold. In FIG. 4, the symmetric axis of the mold is represented by a chain line. In the cross section containing the symmetric axis of the mold, a periodic structure is generated through a radius of curvature of the contour of a blade of the ball end mill. The height of the periodic structure is defined as a theoretical value of surface roughness Ry_rad in the radial direction. The surface roughness in the radial direction means the surface roughness in a cross section containing the symmetric axis of the mold. The theoretical value of surface roughness Ry_rad in the radial direction can be represented by the following expression.

$$Ry\_rad = P^2/(8*R\_tool) \quad (1)$$

P represents an interval in the radial direction between path, i.e. a pitch of the spiral tool path, and R_tool represents a radius of curvature of the contour of a blade of the ball end mill. The interval in the radial direction means the interval in a cross section containing the symmetric axis of the mold. Expression (1) is an approximation in the case that the relationship P<<R_tool holds.

Figure 5A:
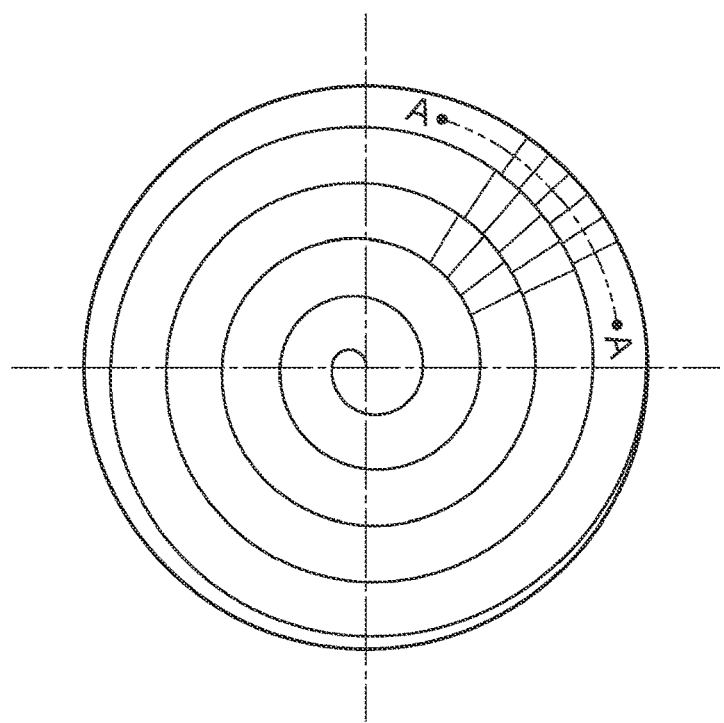
FIG. 5A illustrates a theoretical value of surface roughness of the mold in a cross section containing the tool path.
Figure 5B:
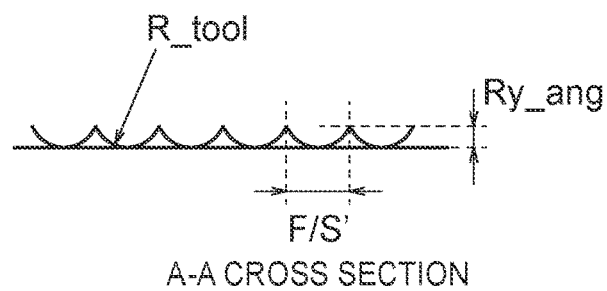
FIG. 5B illustrates a theoretical value of surface roughness of the mold in a cross section containing the tool path.

FIG. 5A and FIG. 5B illustrate a theoretical value of surface roughness of the mold in a cross section along the tool path. FIG. 5A shows the spiral tool path observed from the top of the symmetric axis. In FIG. 5A, the spiral curve represents the tool path of the end mill. FIG. 5B shows a cross section containing a section A-A along the tool path that is represented by a two-dot chain line in FIG. 5A. In the cross section containing the section A-A, a periodic structure is generated through a radius of curvature of the contour of a blade of the ball end mill. The height of the periodic structure is defined as a theoretical value of surface roughness Ry_ang in the angular direction. The theoretical value of surface roughness Ry_ang in the angular direction can be represented by the following expression. The surface roughness in the angular direction means the surface roughness in a cross section containing normals to the mold surface at points on the spiral path.

$$Ry\_ang = (F/S')^2/(8*R\_tool) \quad (2)$$

F represents an amount of relative movement in minute between the tool and the work (a feed rate of machining), and S' represents a rotation rate in minute of the tool. Expression (2) is an approximation in the case that the relationship (F/S')<<R_tool holds.

When a mold for a surface of a lens having an aperture of 2-3 millimeters is machined, the diameter of a spiral curve is small and (F/S) is small. Accordingly, the relationship $$Ry\_rad >> Ry\_ang$$

holds, and a theoretical value of surface roughness of the mold surface is determined mainly by the theoretical value of surface roughness Ry_rad in the radial direction.

The spiral tool path of the end mill is of a circle, the diameter of which is close to the lens diameter, immediately after the machining starts. Actually, the radius of the circular path is smaller than the lens radius due to offset of the end mill. As the machining progresses, the radius of the circular path becomes smaller, and a circular path having a very small radius is generated around the position corresponding to the central axis of the lens. The feed rate of the end mill should be changed depending on the radius of the circular path to optimize machining efficiency.

Figure 6:
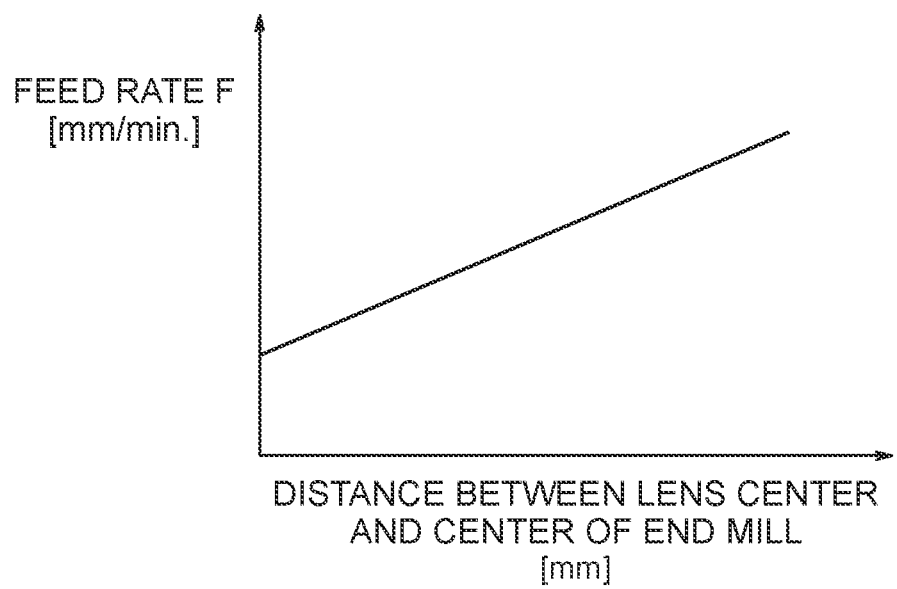
FIG. 6 shows an example of a relationship between feed rate of an end mill and distance between the lens center and the center of the end mill.

FIG. 6 shows an example of a relationship between feed rate of an end mill and distance between the lens center and the center of the end mill. The lens center refers to the position on the mold, the position corresponding to the central axis of the lens. The center of the end mill refers to the position of the central axis of the end mill. As the distance between the lens center and the center of the end mill becomes smaller, the feed rate is reduced because the end mill is required to move at a higher frequency.

In the most recent ultra precision machine tool, the maximum value of tool feed rate is approximately 50 mm/min for a circular path having the radius of 1 mm, for example. When the rotation rate S' of the tool is 50000 rpm, an amount of feed per rotation F/S' of the tool is 0.001 mm. On the other hand, the minimum value of radius of curvature of a generally available tool is approximately 0.05 mm, and Ry_ang is approximately 2.5 nm. Actually, a smaller feed rate is employed, and the relationship $$Ry\_rad >> Ry\_ang$$

holds unless a target value of roughness of a finished surface is made extremely small.

According to Expression (1), the theoretical value of surface roughness Ry_rad in the radial direction is determined by an interval in the radial direction between path, i.e. a pitch P of the spiral tool path and a radius of curvature R_tool of the contour of a blade of the ball end mill. The radius of curvature R_tool of the contour of the blade of the ball end mill is fixed, and the pitch P of the spiral curve is required to be made equal to or smaller than a predetermined value in order to make the theoretical value of surface roughness Ry_rad in the radial direction equal to or smaller than a predetermined value.

On the other hand, the radius of curvature R_tool of the contour of the blade of the ball end mill is required to be made smaller than the minimum curvature of the contour of a cross section of a mold to be machined. Thus, in the case of a ball end mill, a radius of curvature R_tool of the contour of a blade of the ball end mill is restricted by the minimum curvature of the contour of a cross section of a mold to be machined, and a pitch P of a spiral curve is restricted by the radius of curvature R_tool of the contour of the blade of the ball end mill. Machining efficiency of a spiral machining is determined mainly by the pitch, and machining efficiency of a spiral machining with a ball end mill is restricted by the minimum curvature of the contour of a cross section of a mold to be machined.

Figure 7:
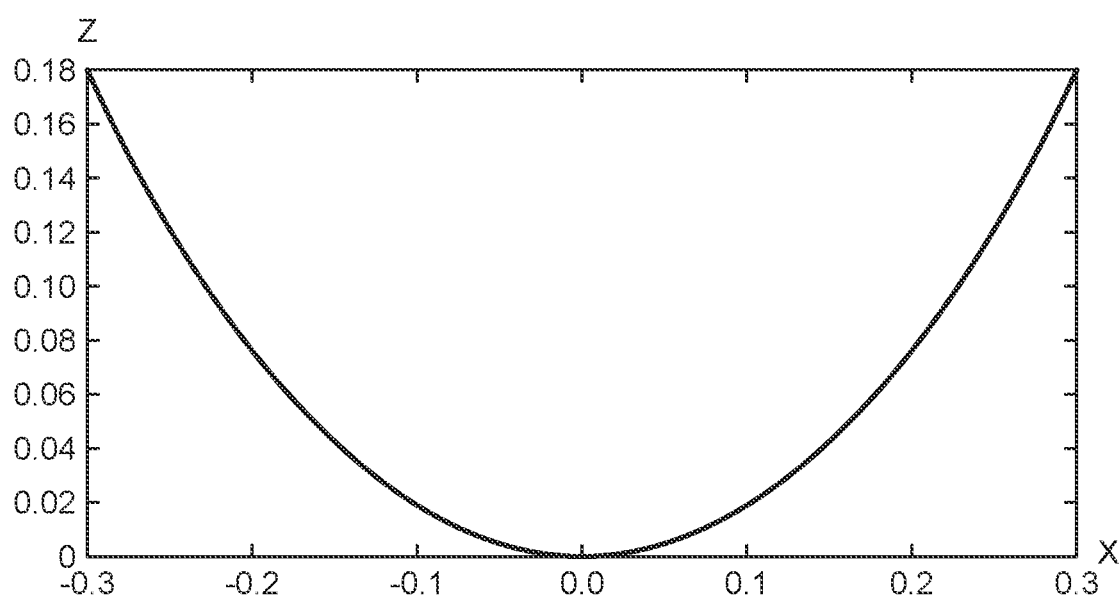
FIG. 7 shows an example of a cross section of a microlens corresponding to a mold to be machined, the cross section containing the central axis of a lens surface of the microlens.

FIG. 7 shows an example of a cross section of a microlens corresponding to a mold to be machined, the cross section containing the central axis of a lens surface of the microlens. The central axis of a lens surface means the optical axis of the lens surface. The shape of the cross section shown in FIG. 7 is identical with the shape of a cross section of the mold for the lens. The shape of the lens is represented by the following expression.

$$z = \frac{h^2/R}{1 + \sqrt{1(1+k) \times h^2/R^2}} \quad (3)$$

-continued where $$h = \sqrt{x^2 + y^2}$$

z represents coordinate in the direction of the central axis with respect to the center of the surface, i.e. the apex of the lens, x, y and z represent orthogonal coordinates, h represents distance from the central axis, R represents a radius of curvature at the center, and k represents the conic constant. As to the lens shown in FIG. 7, the relationships R=0.27 mm and k=−0.8 hold. In FIG. 7, the horizontal axis represents coordinate x in the radial direction with respect to the central axis, and the vertical axis represents coordinate z in the central axis direction with respect to the apex of the lens. The coordinate in the radial direction means the coordinate in a direction perpendicular to the central axis. The unit of the horizontal axis and the vertical axis is millimeter.

In the above-described shape, the radius of curvature at r=0 mm corresponding to the center of the lens surface is 0.27 mm, the radius of curvature increases with radius, and the radius of curvature at r=0.3 mm corresponding to the periphery of the lens surface is 0.71 mm. The radius of curvature of the contour of a blade of a diamond ball end mill is required to be equal to or smaller than the minimum radius of curvature of 0.27 mm. Further, in order to make corrections of shape errors and to avoid deterioration in surface roughness due to chattering of the surface to be machined, a radius of curvature of 0.203 mm (75% of the minimum value of 0.27 mm of radius of curvature of the lens surface) is preferable. Thus, machining efficiency is restricted by the radius of curvature of 0.203 mm of the contour of a blade when a mold for the lens surface of the microlens shown in FIG. 7 is machined through a spiral machining with the ball end mill.

Figure 8:
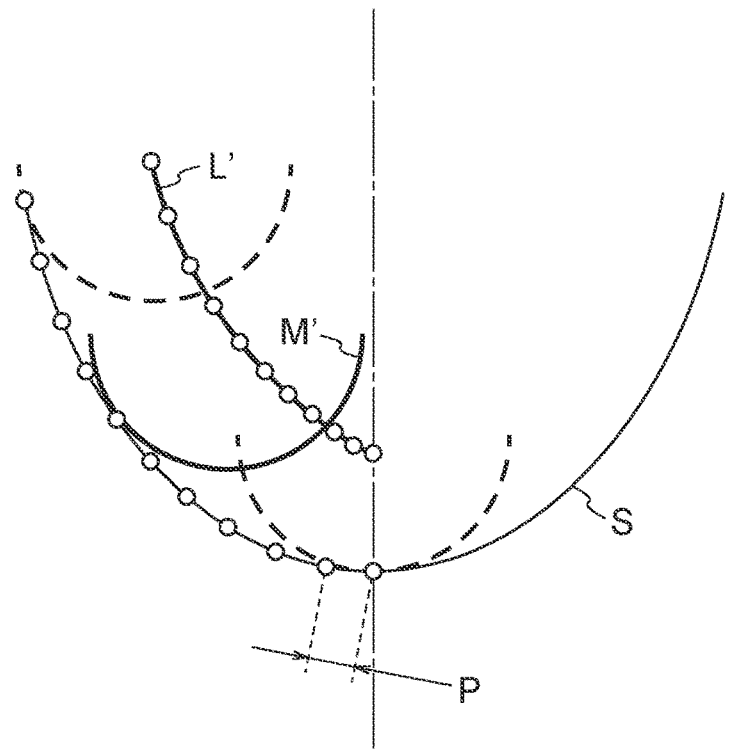
FIG. 8 shows a contour of a blade of a ball end mill and a surface of a mold to be machined in a cross section containing the central axes of the both.

FIG. 8 shows a contour of a blade of a ball end mill and a surface of a mold to be machined in a cross section containing the central axes of the both. In FIG. 8, the central axis of the mold is represented by the chain line. The central axis of the mold means an axis of the mold, the axis corresponding to the central axis (the optical axis) of a lens formed by the mold. In FIG. 8, S represents the surface of the mold to be machined, and M' represents the contour of the blade of the ball end mill. White dots on the surface S represent a spiral tool path, and P represents an interval in the radial direction between the spiral tool path, i.e. a pitch. L' represents a curve connecting white dots representing a path of the ball end mill, which corresponds to the spiral tool path. A white dot on L' represents a position of a point on the central axis of the end mill when one of the white dots on S is machined by the end mill. As described above, in order to make a theoretical value of surface roughness Ry_rad in the radial direction equal to or smaller than a predetermined value, the pitch P of the spiral curve is required to be determined by a radius of curvature of the contour of a blade, the radius of curvature being restricted by the minimum value of radius of curvature of the contour of a cross section of the mold. Thus, the pitch is fixed on the surface S in FIG. 8. In FIG. 8, a radius of curvature of the contour of a cross section containing the central axis of the surface of the mold to be machined is minimum on the central axis and increases with distance from the central axis like the case shown in FIG. 7.

When a surface in which a radius of curvature of the contour of a cross section containing the central axis remarkably varies depending on distance from the central axis like the surface shown in FIG. 7 is subjected to a spiral machining, it is considered to be advantageous in order to increase machining efficiency to employ a blade in which a radius of curvature of the contour varies in a predetermined range and to use a portion of the blade for a portion of the mold in the spiral machining, a radius of curvature of the portion of the blade corresponding to a radius of curvature of the portion of the mold. Accordingly, to employ an end mill provided with a blade for a spiral machining of a mold, a cross section containing the central axis of the contour of the blade being made similar in shape to a partial area of a cross section containing the central axis of the surface of the mold to be machined will be studied below. An end mill provided with a blade, a cross section containing the central axis of the contour of the blade being made similar in shape to a partial area of a cross section containing the central axis of the surface of the mold to be machined is referred to as an end mill of the present invention. In the text of specification, "similar" means "geometrically similar", and "similarity" means "geometrical similarity."

Figure 9:
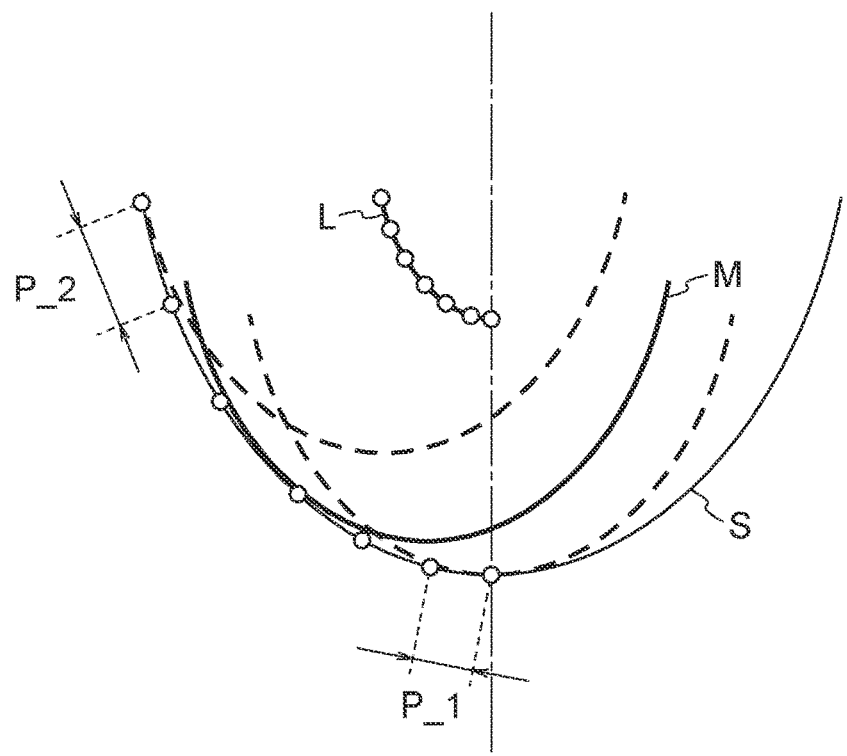
FIG. 9 shows a contour of a blade of an end mill of the present invention and a surface of a mold to be machined in a cross section containing the central axes of the both.

FIG. 9 shows a contour of a blade of an end mill of the present invention and a surface of a mold to be machined in a cross section containing the central axes of the both. In FIG. 9, the central axis of the mold is represented by a chain line. In FIG. 9, S represents the surface of the mold to be machined, and M represents the contour of the blade of the end mill of the present invention. White dots on the surface S represent a spiral tool path. L represents a curve connecting white dots representing a spiral path of the end mill of the present invention, and the spiral path of the end mill corresponds to the spiral tool path. A white dot on L represents a position of a point on the central axis of the end mill when one of the white dots on S is machined by the end mill. The shape of the surface S of the mold to be machined is identical with the shape shown in FIG. 8. In a method with the end mill of the present invention, a point on the contour of the cross section of the surface S is machined with a point on the contour M, the point on the contour M that is similar in shape to the contour of the cross section of the surface S being the corresponding to the point on the contour of the cross section of the surface S in the similarity. In FIG. 9, a pitch P_1 around the central axis of the mold is equal to the pitch P shown in FIG. 8. A radius of curvature of the cross section of the surface S at a point that is a predetermined distance away from the central axis of the mold is greater than a radius of curvature of the cross section of the surface S on the central axis, and a radius of curvature at the point on the contour M used to machine the point that is the predetermined distance away from the central axis of the mold is greater than a radius of curvature at the point on the contour M used to machine a point around the central axis of the mold. Accordingly, even if a pitch P_2 at the point that is the predetermined distance away from the central axis of the mold is made greater than the pitch P shown in FIG. 8, a predetermined value of surface roughness can be realized. Machining efficiency is substantially proportional to pitch, and the end mill of the present invention is capable of increasing machining efficiency of a spiral machining with greater pitches.

A shape of a mold for which the end mill of the present invention can advantageously be used will be studied below. A cross section containing the central axis of a surface of a mold to be machined should preferably be concave in an area contour length of which is 50% or greater of the contour length of the area corresponding to an optical surface of a lens, and the contour of the cross section should preferably be continuous. The cross section containing the central axis of the surface of the mold to be machined should more preferably be concave in an area contour length of which is 75% or greater of the contour length of the area corresponding to the optical surface of the lens, and the contour of the cross section should preferably be continuous. A ratio of the maximum value to the minimum value of radius of curvature in the area should preferably be 2 or greater, and should more preferably be 3 or greater. When the ratio is less than 2, a remarkable increase in machining efficiency cannot be expected.

Figure 10A:
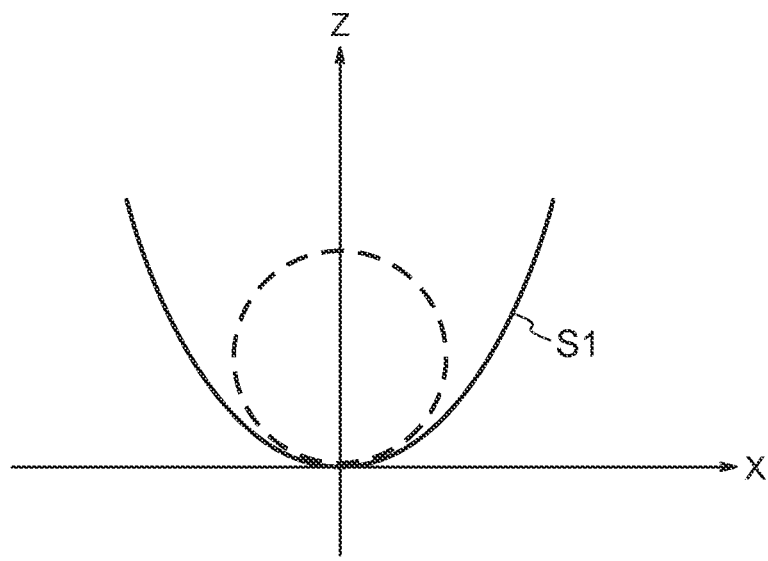
FIG. 10A shows an example of a shape S1 of a cross section containing the central axis of a mold for which the end mill of the present invention can advantageously be used.

FIG. 10A shows an example of a shape S1 of a cross section containing the central axis of a mold for which the end mill of the present invention can advantageously be used.

Figure 10B:
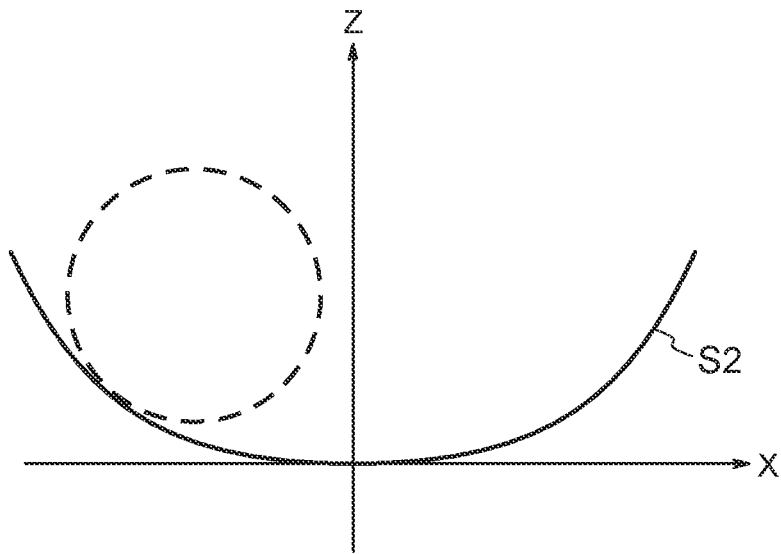
FIG. 10B shows another example of a shape S2 of a cross section containing the central axis of a mold for which the end mill of the present invention can advantageously be used.

FIG. 10B shows another example of a shape S2 of a cross section containing the central axis of a mold for which the end mill of the present invention can advantageously be used.

The horizontal axis of FIG. 10A and FIG. 10B represents coordinate x in the radial direction with respect to the central axis, and the vertical axis of FIG. 10A and FIG. 10B represents coordinate z in the central axis direction with respect to the point corresponding to the apex of the lens. In FIG. 10A a radius of curvature of the shape S1 of the cross section is minimum at x=0, and monotonously increases with distance from the central axis. In FIG. 10B, a radius of curvature of the shape S2 of the cross section is minimum at a point, a distance between the point and the central axis being nonzero. In FIG. 10A and FIG. 10B, a broken line represents a circle that is in contact with the shape S1 of the cross section or the shape S2 of the cross section and has a radius the value of which is equal to the minimum value of radius of curvature.

How to evaluate machining efficiency with the end mill of the present invention for a given shape of a lens will be described below.

Figure 11:
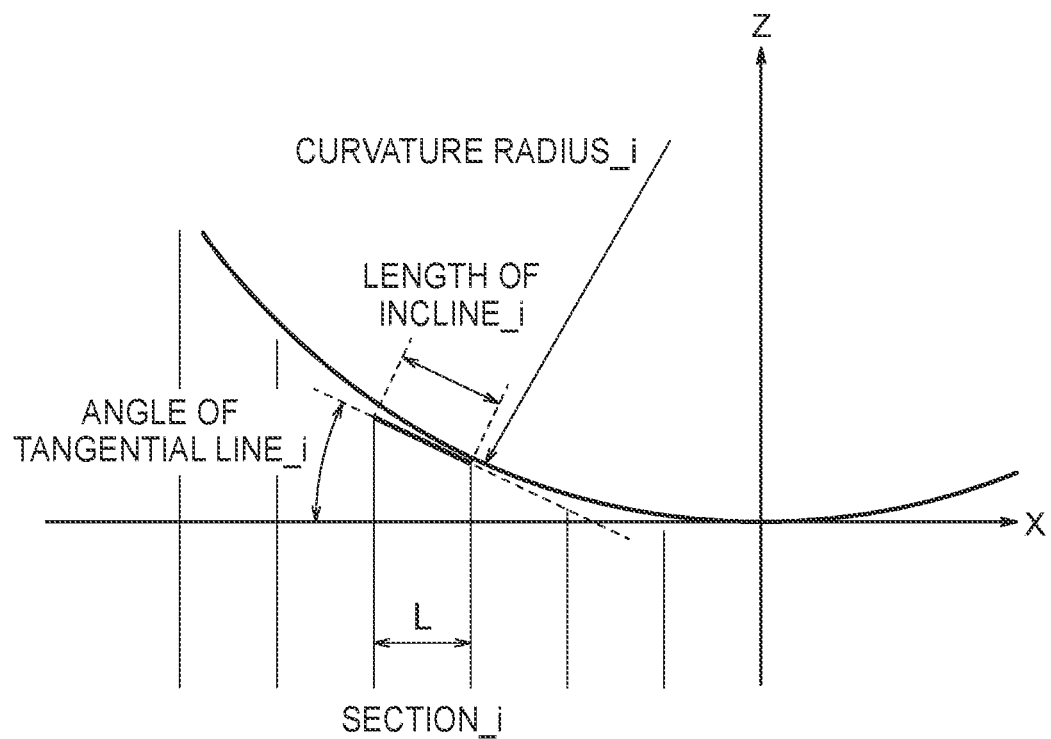
FIG. 11 shows a cross section containing the central axis of a lens and a mold.

FIG. 11 shows a cross section containing the central axis of a lens and a mold. The horizontal axis of FIG. 11 represents coordinate x in the radial direction with respect to the central axis, and the vertical axis of FIG. 11 represents coordinate z in the central axis direction with respect to the apex of the lens.

At first, the cross section of the lens and the mold is divided into sections each of which has a length of L in the horizontal direction, and number i is assigned to each section as shown in FIG. 11. A position, an angle of a tangential line, a length of an incline and a radius of curvature of a section i are obtained. The position corresponds to a distance from the z-axis. The angle of a tangential line means an angle (an acute angle) formed by the tangential line at a point on the contour of the cross section and the x-axis. The position, the angle of a tangential line and the radius of curvature of the section i may be the position, the angle of the tangential line and the radius of curvature at the end of the section i closest to the central axis. As the length of the incline of the section i, an approximate value obtained from the angle of the tangential line and the length L of the section i may be used.

Then, machining efficiency in the section i is evaluated. In a machining method with the end mill of the present invention, when a radius of curvature of the contour of a cross section of a surface at a point to be machined is a times as great as the minimum radius of curvature, a radius of curvature R_tool of the contour of the corresponding portion of a blade of the end mill is also a times as great as the minimum radius of curvature of the contour of the blade of the end mill. Accordingly, when a theoretical value of surface roughness Ry_rad is fixed, a pitch that is $\alpha^{1/2}$ times as great as the pitch employed with a ball end mill can be employed in the section i according to Expression (1). Thus, machining efficiency in the section i is $\alpha^{1/2}$ times as great as the machining efficiency with a ball end mill.

Then, the machining efficiency in the section i is multiplied by a ratio of the length of the incline of the section i to the total length of the incline, and the total machining efficiency is obtained by obtaining a sum of the products of all the sections.

Table 1 shows a procedure of evaluation of machining efficiency in the case that the shape of a lens is represented by Expression (3) with R=0.27 and k=−0.8, and is shown in FIG. 7.

TABLE 1

| Section No. i | 1 | 2 | 3 | 4 | 5 | 6 | 7 | Total |
|---|---|---|---|---|---|---|---|---|
| Position [mm] | 0.00 | 0.05 | 0.10 | 0.15 | 0.20 | 0.25 | 0.30 | |
| Angle of tangential line [degree] | 0.00 | 10.53 | 20.58 | 29.84 | 38.13 | 45.49 | 52.00 | |
| Length of incline [mm] | 0.05 | 0.05 | 0.05 | 0.06 | 0.06 | 0.07 | 0.08 | 0.43 |
| Radius of curvature [mm] | 0.27 | 0.28 | 0.32 | 0.38 | 0.47 | 0.59 | 0.76 | |
| (Radius of curvature/minimum radius of curvature)$^{1/2}$ × (Length of incline/whole length) | 0.12 | 0.12 | 0.14 | 0.16 | 0.20 | 0.25 | 0.32 | 1.29 |

According to Table 1, the machining efficiency of the machining method with the end mill of the present invention is approximately 1.3 times as great as the machining efficiency of a machining method with a ball end mill. In an actual machining, feed rate is also influential in the machining efficiency as described with FIG. 6, and the machining efficiency of the machining method with the end mill of the present invention is approximately 1.5 times as great as the machining efficiency of a machining method with a ball end mill.

Table 2 shows a procedure of evaluation of machining efficiency in the case that the shape of a lens is represented by Expression (3) with R=0.08 and k=−2.8.

TABLE 2

| Section No. i | 1 | 2 | 3 | 4 | 5 | 6 | 7 | Total |
|---|---|---|---|---|---|---|---|---|
| Position [mm] | 0.00 | 0.05 | 0.10 | 0.15 | 0.20 | 0.25 | 0.30 | |
| Angle of tangential line [degree] | 0.00 | 25.59 | 32.63 | 34.71 | 35.53 | 35.94 | 36.17 | |
| Length of incline [mm] | 0.05 | 0.06 | 0.06 | 0.06 | 0.06 | 0.06 | 0.06 | 0.41 |
| Radius of curvature [mm] | 0.08 | 0.24 | 1.00 | 2.86 | 3.33 | 3.33 | 3.33 | |
| (Radius of curvature/minimum radius of curvature)$^{1/2}$ × (Length of incline/whole length) | 0.12 | 0.23 | 0.51 | 0.89 | 0.97 | 0.97 | 0.97 | 4.67 |

According to Table 2, the machining efficiency of the machining method with the end mill of the present invention is approximately 4.7 times as great as the machining efficiency of a machining method with a ball end mill. In an actual machining, feed rate is also influential in the machining efficiency as described with FIG. 6, and the machining efficiency of the machining method with the end mill of the present invention is approximately 5 times as great as the machining efficiency of a machining method with a ball end mill. In the area where his 0.2 mm or greater, a radius of curvature of the contour of the blade of the end mill is set to the upper limit corresponding to the radius of curvature of 3.33 mm on the contour of a cross section of the lens. The upper limit of radius of curvature of the contour of a blade of an end mill will be described later.

In some cases, a cross section of a microlens corresponding to a mold to be machined, the cross section containing the central axis of a lens surface of the microlens, and a cross section containing the central axis of the mold for the lens can be represented by the following expression.

$$z = \sum_{i=2}^{20} A_i \times |h|^i \quad (4)$$

$$h = \sqrt{x^2 + y^2}$$

z represents coordinate in the direction of the central axis with respect to the center of the surface, i.e. the apex of the lens, x, y and z represent orthogonal coordinates, h represents distance from the central axis, i represents an integer that is 2 or greater and Ai represents a coefficient.

Further, in some other cases, a cross section of a microlens corresponding to a mold to be machined, the cross section containing the central axis of a lens surface of the microlens, and a cross section containing the central axis of the mold for the lens can be represented by a combination of Expression (3) and Expression (4). More generally, a cross section of a microlens corresponding to a mold to be machined, the cross section containing the central axis of a lens surface of the microlens, and a cross section containing the central axis of the mold for the lens may be in any shape that is defined by an arbitrary function.

How to determine the shape of a blade of the end mill of the present invention will be described below. The shape of a cross section containing the central axis of the end mill is so formed as to be similar to the shape of a cross section containing the central axis of a mold. When the shape of a cross section containing the central axis of a lens surface corresponding to the mold is represented by Expression (3) or Expression (4), the shape of a cross section containing the central axis of the end mill is represented by Expression (5) or Expression (6) given below.

$$z = \frac{h^2/(\Delta \times R)}{1 + \sqrt{1 - (1+k) \times h^2/(\Delta^2 \times R^2)}} \quad (5)$$

$$z = \sum_{i=2}^{20} (A_i/\Delta^{i-1}) \times |h|^i \quad (6)$$

where $$h = \sqrt{x^2 + y^2}$$

z represents coordinate in the direction of the central axis with respect to the edge of the blade, x, y and z represent orthogonal coordinates, h represents distance from the central axis, R represents a radius of curvature at the center of a lens or a mold, k represents the conic constant, i represents an integer that is 2 or greater, and Ai represents a coefficient. Δ represents a ratio of similitude, which ranges from 70% to 80%.

When the minimum radius of curvature of the shape of a cross section containing the central axis of a mold is 0.1 mm or smaller, the minimum radius of curvature of the shape of a cross section containing the central axis of a blade of the end mill is small and thickness of the blade is very small. Such a blade might cause wear and blade tipping during a period of machining. In this case, the ratio of similitude should preferably be approximately 80%. Further, when the minimum radius of curvature of the shape of a cross section containing the central axis of a mold is 0.05 mm or smaller, the ratio of similitude should preferably be approximately 85%.

Further, in order to avoid a plane-to-plane contact of the tool, an upper limit of radius of curvature of the shape of a cross section containing the central axis of the blade of the end mill is provided. From experience, the value of the upper limit should range from 2.0-2.5 mm. With a radius of curvature that is greater than the upper limit, the length of the ridge line used for machining of the blade of the end mill is so great that resistance in machining increases while the blade of the end mill rotates, and phenomena such as chattering which lead to deterioration in machining accuracy occur. A too long ridge line used for machining leads to a plane-to-plane contact. The upper limit of 3.33 mm in Table 2 corresponds to the above-described upper limit of 2.5 (=3.33×0.75) mm.

How to determine the shape of a cross section containing the central axis of a blade of the end mill of the present invention will specifically be described below.

Figure 12A:
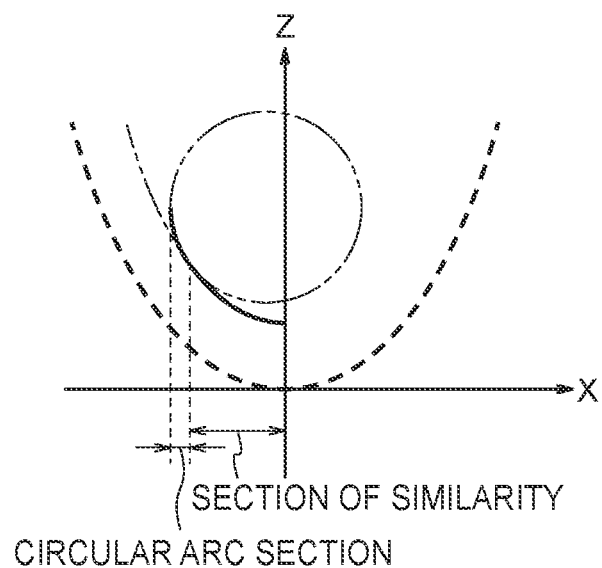
FIG. 12A illustrates how to determine the shape of a cross section containing the central axis of a blade of the end mill that corresponds to the shape of the mold shown in 10A.

FIG. 12A illustrates how to determine the shape of a cross section containing the central axis of a blade of the end mill that corresponds to the shape of the mold shown in 10A. The horizontal axis of FIG. 12A represents coordinate x in the radial direction with respect to the central axis, and the vertical axis of FIG. 12A represents coordinate z in the central axis direction with respect to the point corresponding to the apex of the lens. In FIG. 12A, a broken line represents the shape of a cross section containing the central axis of the mold, and two-dot chain lines represent the shape of a cross section containing the central axis of the blade of the end mill, the shape being similar to the shape of the cross section containing the central axis of the mold, and a circle having a radius the value of which is identical with the upper limit of the radius of curvature. The shape of a cross section containing the central axis of the blade of the end mill, the shape being represented by a solid line, is generated by connecting a section the shape of which is similar to the shape of a cross section containing the central axis of the lens, at the point where the radius of curvature of the blade has the value of the upper limit, smoothly to the circle having a radius the value of which is identical with the upper limit of the radius of curvature. In FIG. 12A, the end mill is arranged such that the central axis of the end mill agrees with the central axis of the mold. The section of the contour of the end mill which is geometrically similar to the contour of a cross section containing the central axis of the lens is referred to as a section of similarity of the contour of the end mill, and the section of the circular arc is referred to as a circular act section of the contour of the end mill.

Figure 12B:
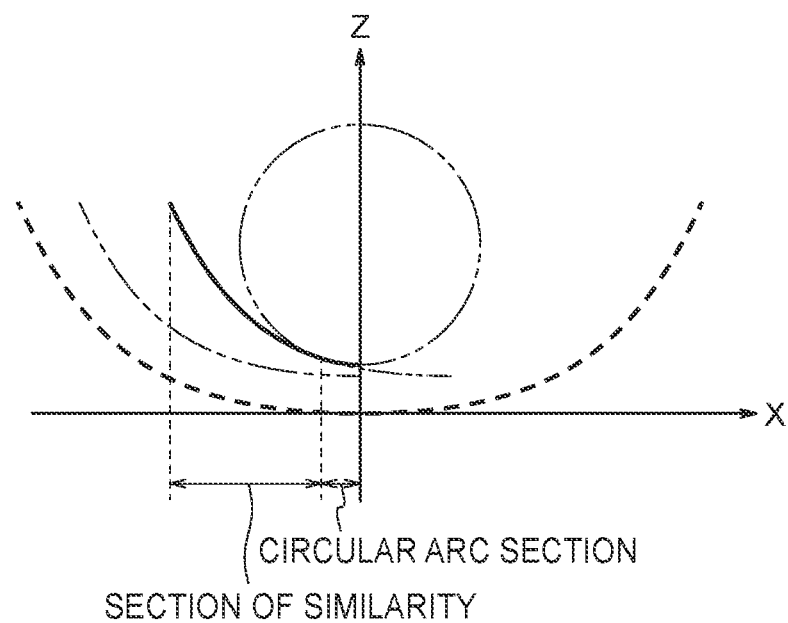
FIG. 12B illustrates how to determine the shape of a cross section containing the central axis of a blade of the end mill that corresponds to the shape of the mold shown in 10B.

FIG. 12B illustrates how to determine the shape of a cross section containing the central axis of a blade of the end mill that corresponds to the shape of the mold shown in 10 B. The horizontal axis of FIG. 12B represents coordinate x in the radial direction with respect to the central axis, and the vertical axis of FIG. 12B represents coordinate z in the central axis direction with respect to the point corresponding to the apex of the lens. In FIG. 12B, a broken line represents the shape of a cross section containing the central axis of the mold, and a lower two-dot chain line represents a shape that is geometrically similar to the shape of the cross section containing the central axis of the mold. The solid line represents the contour of a cross section containing the central axis of the blade of the end mill, and the contour includes a section of similarity the shape of which is geometrically similar to the shape of a cross section containing the central axis of the mold, and a circular section containing a circle represented by a upper two-dot chain line. The curvature of the circle is identical with the upper limit of the radius of curvature of the section of similarity. The radius of curvature of the contour of a cross section containing the central axis of the blade of the end mill increase as the position becomes closer to the central axis. At the point where the radius of curvature of the blade is equal to the value of the upper limit, the circle having a radius the value of which is identical with the upper limit is connected to the cross section containing the central axis of the blade of the end mill. Then the shape of the end mill is determined such that the central axis of the blade of the end mill passes through the center of the above-described circle. In FIG. 12B, the end mill is arranged such that the central axis of the end mill agrees with the central axis of the mold. The section the shape of which is similar to the shape of a cross section containing the central axis of the lens is referred to as a section of similarity, and the section of the circular arc is referred to as a circular act section.

With FIG. 12A and FIG. 12B, how to determine the shape of a cross section containing the central axis of a blade of the end mill in the case where the upper limit of radius of curvature has to be taken into consideration has been described. In the case where the upper limit of radius of curvature does not need to be taken into consideration, a section of similarity alone of a cross section containing the central axis of a blade of an end mill should be determined without considering a circle having a radius the value of which is identical with the upper limit.

How to determine a path of a reference point of an end mill will be described below.

Figure 13:
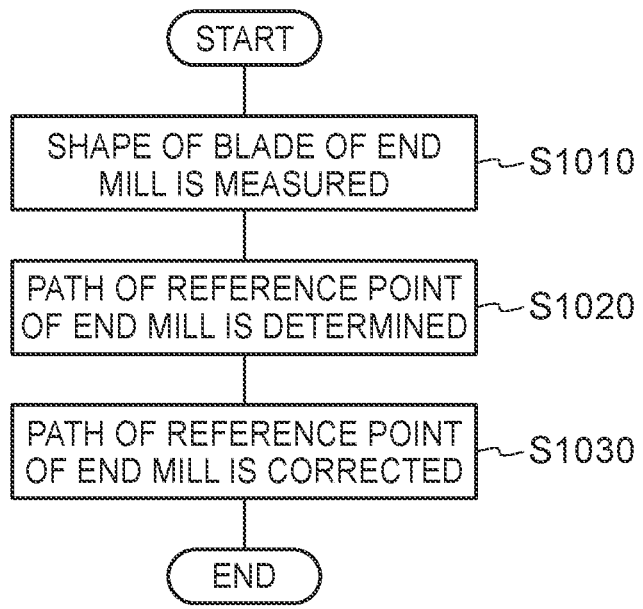
FIG. 13 is a flowchart for illustrating how to determine a path of a reference point of an end mill.

FIG. 13 is a flowchart for illustrating how to determine a path of a reference point of an end mill.

In step S1010 of FIG. 13, the shape of a blade of an end mill is measured. As described above, the shape of a cross section containing the central axis of a blade of the end mill is formed such that the shape is similar with a ratio of similitude of $\Delta$ to the shape of a cross section containing the central axis of a mold. An actual end mill, however, has errors due to manufacturing inaccuracies such as winding errors in shape that is to be described later. Accordingly, an actual value of the ratio of similitude $\Delta'$ in an actual end mill can be measured with a high accuracy. In order to measure the value of $\Delta'$, positions of multiple points on the contour of the blade are measured using a microscope, and $\Delta'$ of the actual shape of the blade of the end mill can be determined by minimizing a difference between the measured shape of the blade and a theoretical shape with $\Delta$ of the blade of the end mill through the least square method. $\Delta'$ can be used in place of $\Delta$ hereinafter.

In step S1020 of FIG. 13, a path of a reference point of the end mill is determined.

Figure 14:
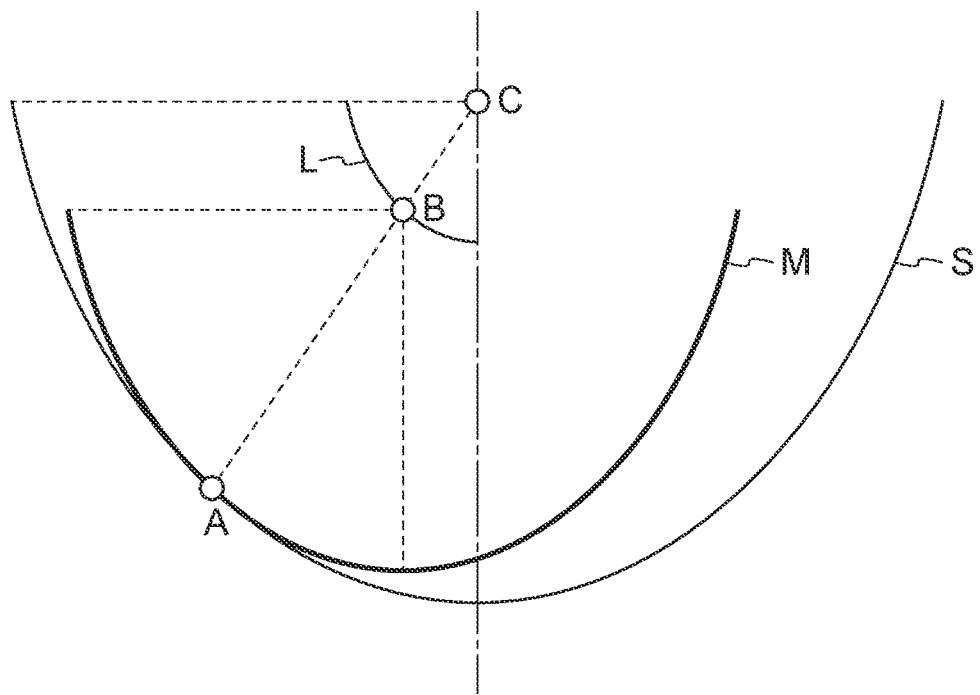
FIG. 14 illustrates a position of a reference point of the end mill in a cross section containing the central axis of a mold.

FIG. 14 illustrates a position of a reference point of the end mill in a cross section containing the central axis of a mold. FIG. 14 shows a cross section containing the central axis of the mold. In FIG. 14, the central axis of the mold is represented by a chain line. In FIG. 14, S represents a surface of the mold, and M represents a cross section containing the central axis of the end mill. Assume that S is represented by Expression (3), and M is represented by Expression (5). In FIG. 14, the section marked with M is a section of similarity. Further, a point A represents a point machined by the end mill on the surface of the mold in the cross section containing the central axis of the mold and the central axis of the end mill. The point A is also referred to as a point of contact of the tool. The above-described tool path is a path on the surface S connecting points of contact of the tool. The point A is machined by a point in the cross section containing the central axis of the end mill, the point corresponding to the point A in the similarity between the shape of the cross section containing the central axis of the end mill and the shape of the cross section containing the central axis of the mold. As shown in FIG. 14, the central axis of the mold is parallel to the central axis of the end mill, and at the point A, the tangential line on the contour of the cross section of the mold agrees with the tangential line on the contour of the cross section of the end mill. An arbitrary point on the central axis of the mold is defined as a reference point C of the mold. The point of intersection between a straight line connecting the point A of contact of the tool and the reference point C of the mold and the central axis of the end mill is represented by B. The point B is the point of the end mill corresponding to the reference point C of the mold in the similarity between the shape of the end mill and the shape of the mold, and is referred to as a reference point of the end mill. The point A, the point B and the point C are located on a straight line, and the relationship AB:BC=$\Delta$: 1-$\Delta$ holds. The relationship holds independently of where the point A of contact of the tool is located on the surface S. Thus, a curve L that represents a line on which the reference point B of the end mill can be located is of a shape that is similar to the shape of the mold and is obtained by reducing the size of the shape of the mold with a ratio of similarity of 1-$\Delta$. For example, the curve L that represents a line on which the reference point B of the end mill can be located and that is similar to the shape of the mold defined by Expression (3) or (4) can be obtained by replacing $\Delta$ with 1-$\Delta$ in Expression (5) or (6), respectively.

In a circular arc section of an end mill, a position of the reference point of the end mill is determined such that the reference point is located on a normal to the S and is the distance of the radius of curvature away from the point of contact of the tool like in the case of an ordinary spherical ball end mill.

Then, as shown in FIG. 9, points of contact of the tool (corresponding to the point A in FIG. 14) on the mold surface are located depending on an interval in the radial direction, i.e. a pitch with which a required theoretical value of surface roughness can be realized. Further, the reference point of the end mill (corresponding to the point B in FIG. 14) is located from the position of a point of contact of the tool. A spiral path of the points of contact of the tool, the path starting at a point outside the periphery of the mold, is determined by smoothly connecting the points A of contact of the tool. Further, a spiral path of the reference point of the end mill is determined by smoothly connecting the points B that represent the reference points of the end mill.

In step S1030 of FIG. 13, the path of the reference point of the end mill is corrected.

Figure 15:
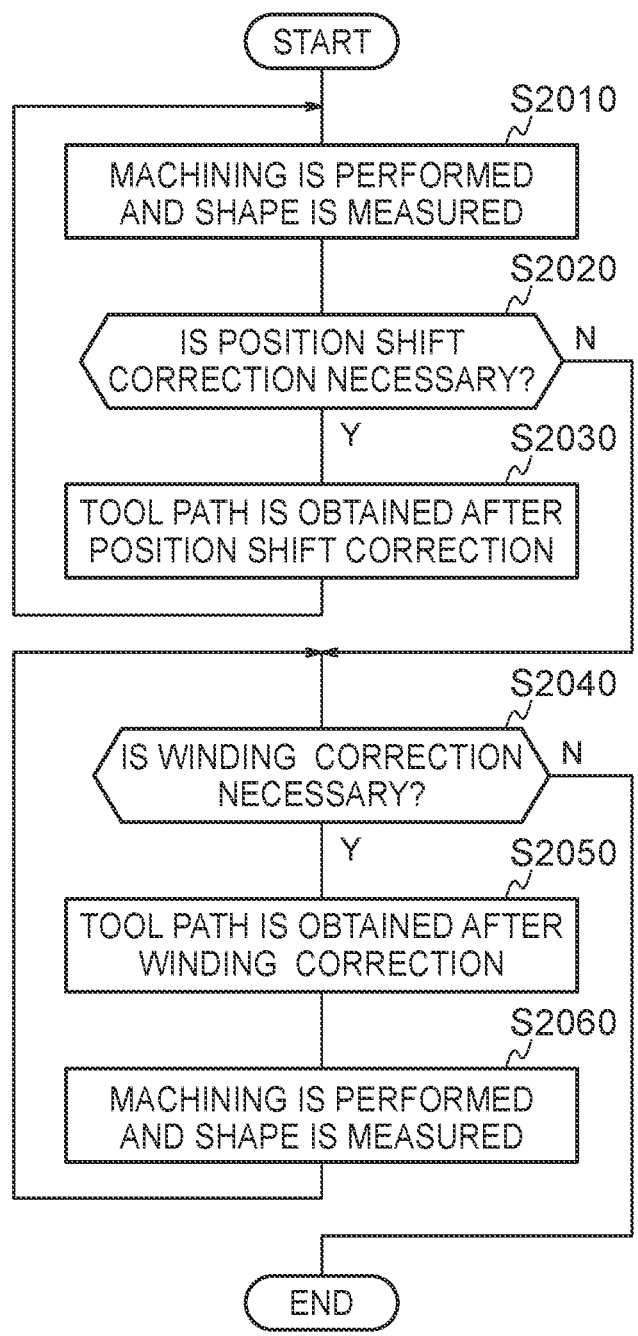
FIG. 15 is a flowchart illustrating step S1030 of FIG. 13.

FIG. 15 is a flowchart illustrating step S1030 of FIG. 13.

In step S2010 of FIG. 15, machining is performed along the path of the reference point of the end mill obtained in step S1020 of FIG. 13, and the shape of the machined mold is measured.

In step S2020 of FIG. 15, it is determined whether a position shift correction is necessary or not. At first, an error in the shape of the mold is obtained. When in spatial frequencies of the error, the spatial frequency that corresponds substantially to the length of the diameter of the lens for which the mold is used is prominent, it is determined that a position shift correction is necessary.

Figure 16:
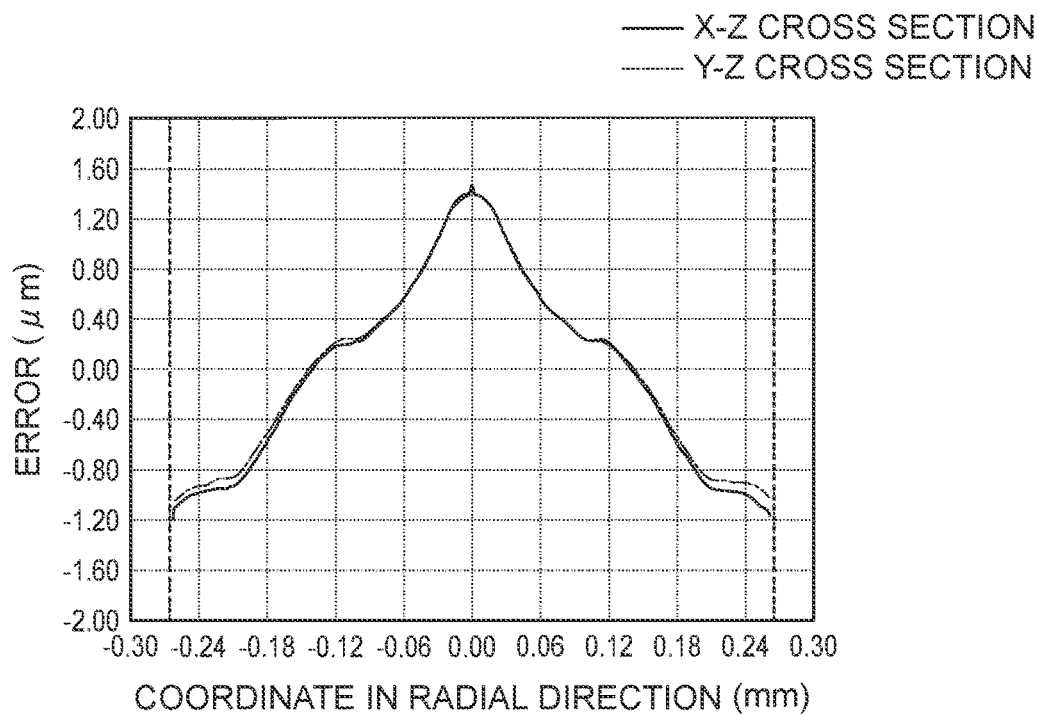
FIG. 16 shows an example of errors in the shape of the mold that has been machined along the path of the reference point of the end mill obtained in step S1020 of FIG. 13.

FIG. 16 shows an example of errors in the shape of the mold that has been machined along the path of the reference point of the end mill obtained in step S1020 of FIG. 13. The shape of the mold is represented by Expression (3) with R=0.27 and k=−0.8, and the radius is 0.3 mm. The shape of the used end mill is represented by Expression (5) with $\Delta$=75%, $\Delta \times R$=0.203 and k=−0.8. In step S1020 of FIG. 13, the pitch of the spiral toll path has been determined such that the theoretical value of surface roughness Ry_rad is 10 nm. The horizontal axis of FIG. 16 represents coordinate in the radial direction with respect to the central axis of the mold, and the vertical axis of FIG. 16 represents magnitude of error. The unit of the horizontal axis is millimeter, and the unit of the vertical axis is micrometer. In FIG. 16, a solid line represents error in the x-z cross section, and a dashed line represents error in the y-z cross section. In FIG. 16, the spatial frequency that corresponds substantially to the length of the diameter of the lens for which the mold is used is prominent, and it is determined that a position shift correction is necessary. The position shift correction means a correction in which the path of the reference point of the end mill is corrected while maintaining the shape of the path of the reference point of the end mill, the shape being similar to the shape of the mold. Errors to be corrected by the position shift correction include an error in the shape of the blade measured in step S1010 of FIG. 13 and an error in positioning generated when the end mill is attached to the finishing machine, i.e. an eccentric error of the contour of the cutting blade with respect to the central axis of rotation of the end mill.

If it is determined that a position shift correction is necessary in step S2020, the process goes to S2030, otherwise the process goes to S2040.

In step S2030 of FIG. 15, a position shift correction of the path of the reference point of the end mill is performed such that errors shown in FIG. 16 is minimized. More specifically, in order to correct an error in the shape of the blade measured, the value A of the ratio of similitude is corrected. Further, in order to correct an error in positioning generated when the end mill is attached to the finishing machine, the distance between the path of the reference point of the end mill and the central axis of the mold is corrected. Thereafter the process goes back to S2010.

In step S2040 of FIG. 15, it is determined whether a winding correction is necessary or not. At first, an error in the shape of the mold is obtained. When in spatial frequencies of the error, the spatial frequency that corresponds to a length smaller than the diameter of the lens for which the mold is used is prominent, it is determined that a winding correction is necessary.

Figure 17:
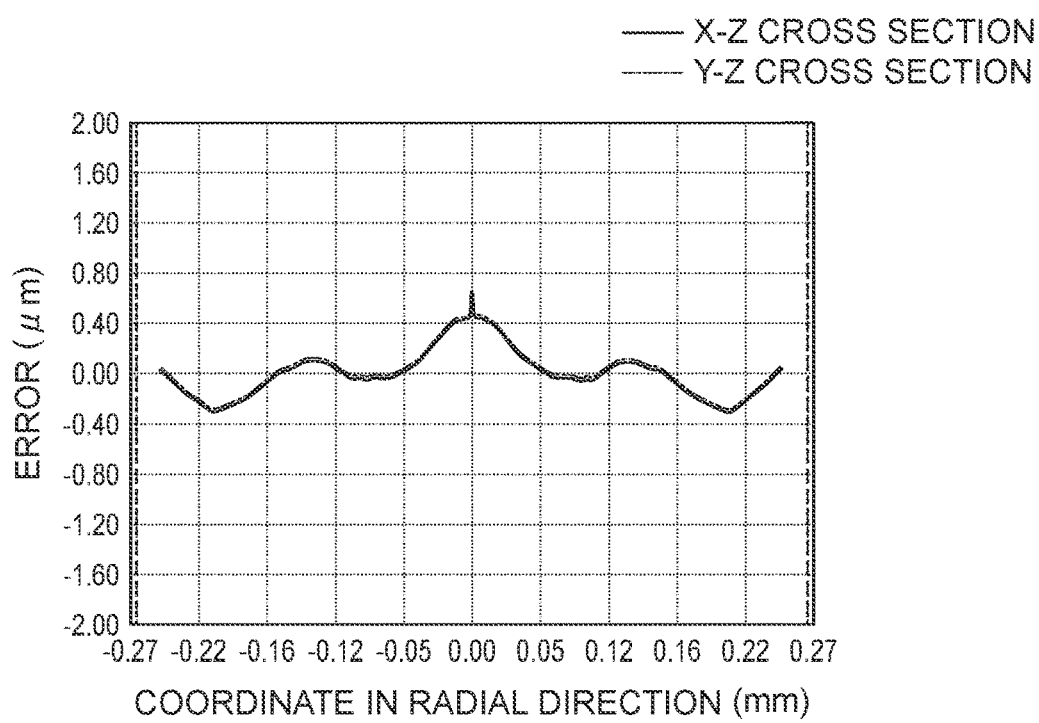
FIG. 17 shows an example of errors in the shape of the mold that has been machined along the path of the reference point of the end mill, the path having been obtained through the position shift correction.

FIG. 17 shows an example of errors in the shape of the mold that has been machined along the path of the reference point of the end mill, the path having been obtained through the position shift correction. The horizontal axis of FIG. 17 represents coordinate in the radial direction with respect to the central axis of the mold, and the vertical axis of FIG. 17 represents magnitude of error. The unit of the horizontal axis is millimeter, and the unit of the vertical axis is micrometer. In FIG. 17, a solid line represents error in the x-z cross section, and a chain line represents error in the y-z cross section. In FIG. 17, the spatial frequency that corresponds substantially to the length of the diameter of the lens for which the mold is used is not prominent, but the spatial frequency that is smaller than the length of the diameter of the lens for which the mold is used is prominent, and it is determined that a winding correction is necessary. The winding correction means a correction in which the shape of the path of the reference point of the end mill is made different from the shape that is similar to the shape of the mold. Errors to be corrected by the winding correction include an error in the shape of the end mill generated in the manufacturing process, an error due to characteristics of the finishing machine, an error generated by a change in machining stress that varies depending on machining position and an error due to wear of the blade.

If it is determined that a winding correction is necessary in step S2040, the process goes to S2050, otherwise the process is terminated.

In step S2050 of FIG. 15, a winding correction of the path of the reference point of the end mill is performed such that errors shown in FIG. 17 is minimized. More specifically, in the winding correction, for example, an error shown in FIG. 17 is expressed by fitting of a function of coordinate of the horizontal axis of FIG. 17, a polynomial of Expression (4), for example, and the function is subtracted from the expression defining the path of the reference point of the end mill.

In step S2060 of FIG. 15, machining is performed along the path of the reference point of the end mill obtained through the winding correction, and the shape of the machined mold is measured. Thereafter the process goes back to step S2040.

Figure 18:
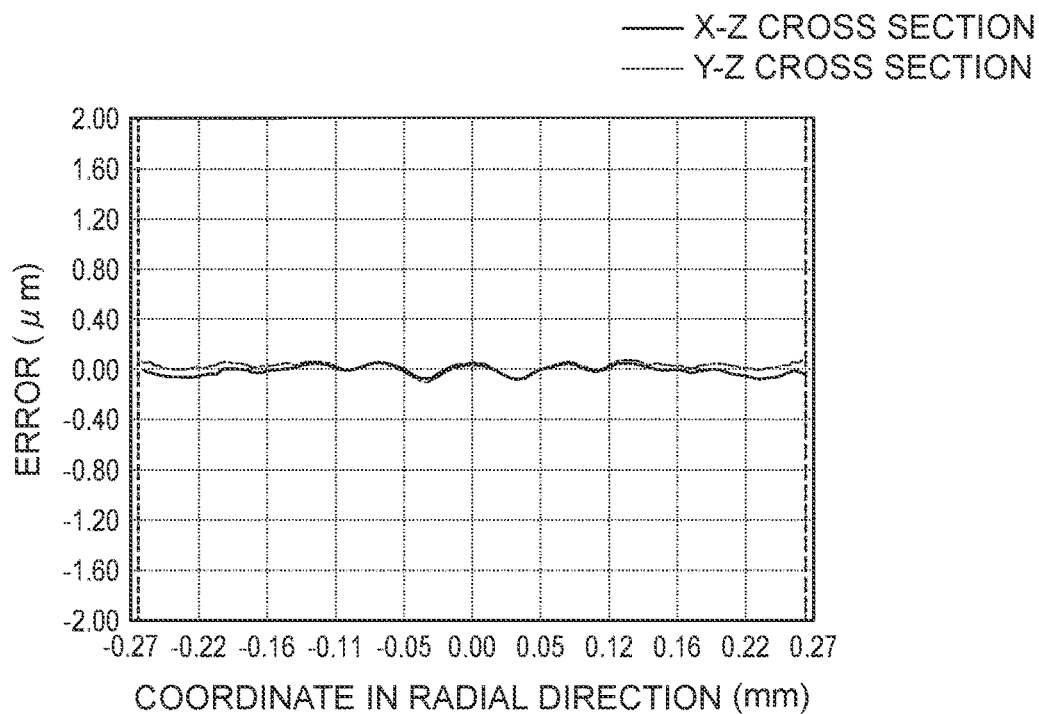
FIG. 18 shows an example of errors in the shape of the mold that has been machined along the path of the reference point of the end mill obtained through a first winding correction.

FIG. 18 shows an example of errors in the shape of the mold that has been machined along the path of the reference point of the end mill obtained through a first winding correction. The horizontal axis of FIG. 18 represents coordinate in the radial direction with respect to the central axis of the mold, and the vertical axis of FIG. 18 represents magnitude of error. The unit of the horizontal axis is millimeter, and the unit of the vertical axis is micrometer. In FIG. 18, a solid line represents error in the x-z cross section, and a chain line represents error in the y-z cross section.

Figure 19:
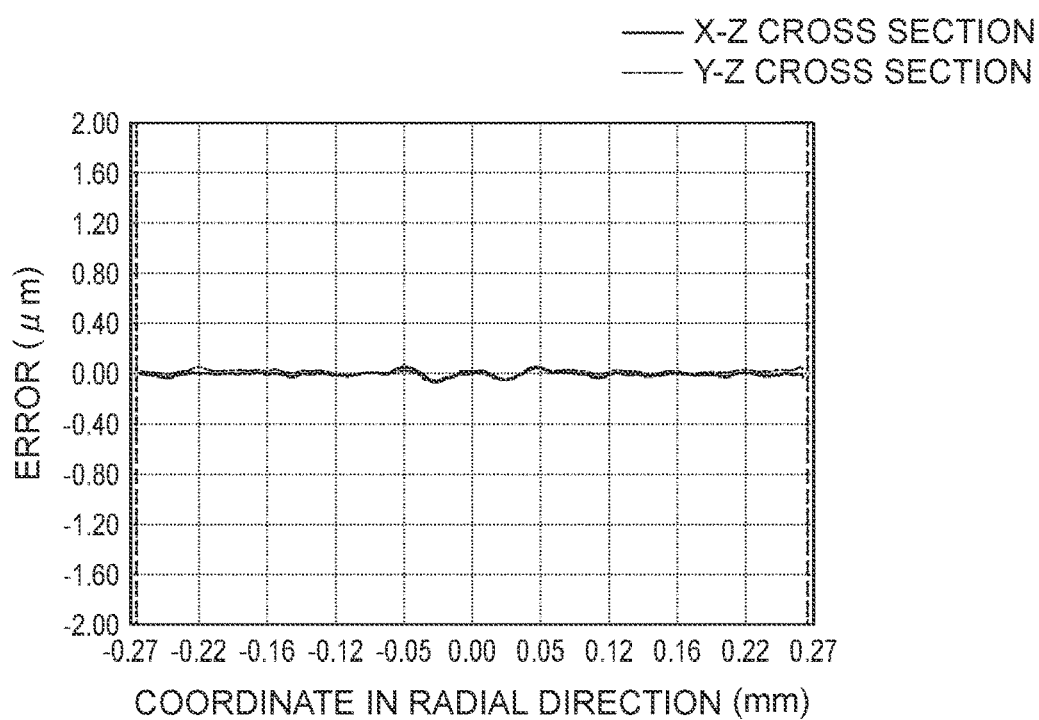
FIG. 19 shows an example of errors in the shape of the mold that has been machined along the path of the reference point of the end mill obtained through a second winding correction.

FIG. 19 shows an example of errors in the shape of the mold that has been machined along the path of the reference point of the end mill obtained through a second winding correction. The horizontal axis of FIG. 19 represents coordinate in the radial direction with respect to the central axis of the mold, and the vertical axis of FIG. 19 represents magnitude of error. The unit of the horizontal axis is millimeter, and the unit of the vertical axis is micrometer. In FIG. 19, a solid line represents error in the x-z cross section, and a chain line represents error in the y-z cross section. According to FIG. 19, a machining error is 0.1 micrometers or smaller.

The shapes of the molds mentioned above are axially symmetric. The present invention is, however, applicable also to molds the shapes of which are not axially symmetric. The present invention is applicable to a mold in which when a z-axis is defined to agree with the central axis of the mold and an x-axis and a y-axis that are orthogonal to each other are defined to be orthogonal to the z-axis, the y-axis can be selected such that in any cross section perpendicular to the y-axis the contour of the mold is line-symmetric with respect to the z-axis. Further, a radius of curvature at any point (a first point) in the area of $$y \leq 0$$

or in the area of $$0 \leq y$$

on the contour of the y-z cross section of the mold has to be smaller than a radius of curvature of a point (a second point) on the contour of any cross section containing the central axis (z-axis), an angle formed by the tangential line at the first point and a plane perpendicular to the z-axis being equal to an angle formed by the tangential line at the second point and a plane perpendicular to the z-axis. Further, in the area of $$y \leq 0$$

or in the area of $$0 \leq y$$

on the contour of the y-z cross section of the mold, a ratio of contour length of an area where the contour is concave and continuous to contour length of the area corresponding to an optical surface of the lens should preferably be 50% or greater, and more preferably be 75% or greater. Further, a ratio of the maximum radius of curvature to the minimum radius of curvature in the above-described area where the contour is concave and continuous should preferably be 2 or greater, and more preferably be 3 or greater.

An example of the mold described above is a mold having a surface that can be represented by the following expressions.

$$z(x, y) = R_x - \sqrt{(R_x - f_y)^2 - x^2} \quad (7)$$

$$f_y = \frac{y^2/R_y}{1 + \sqrt{1 - (1+k) \times y^2/R_y^2}}$$

z represents coordinate in the direction of the central axis with respect to the center of the surface, i.e. the point corresponding to the apex of the lens, x, y and z represent orthogonal coordinates, Rx represents a radius of curvature at the center in the x-axis direction, Ry represents a radius of curvature at the center in the y-axis direction, and k represents the conic constant. In the present example, the relationships Rx=0.5 mm, Ry=0.27 mm and k=−0.8 hold.

Figure 20A:
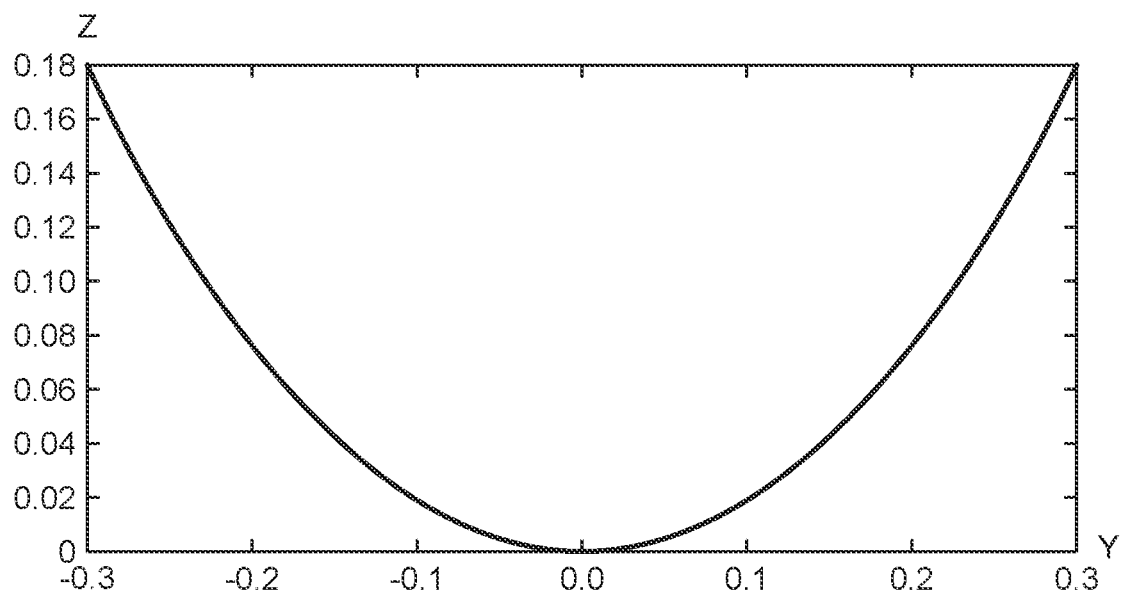
FIG. 20A shows the y-z cross section of a surface represented by Expression (7)

FIG. 20A shows the y-z cross section of a surface represented by Expression (7). The horizontal axis of FIG. 20A represents y, and the vertical axis of FIG. 20A represents z. The unit of the horizontal axis and the vertical axis is millimeter. The shape shown in FIG. 20A is identical with the shape shown in FIG. 7 and represented by Expression (3) with R=0.27 mm and k=−0.8.

Figure 20B:
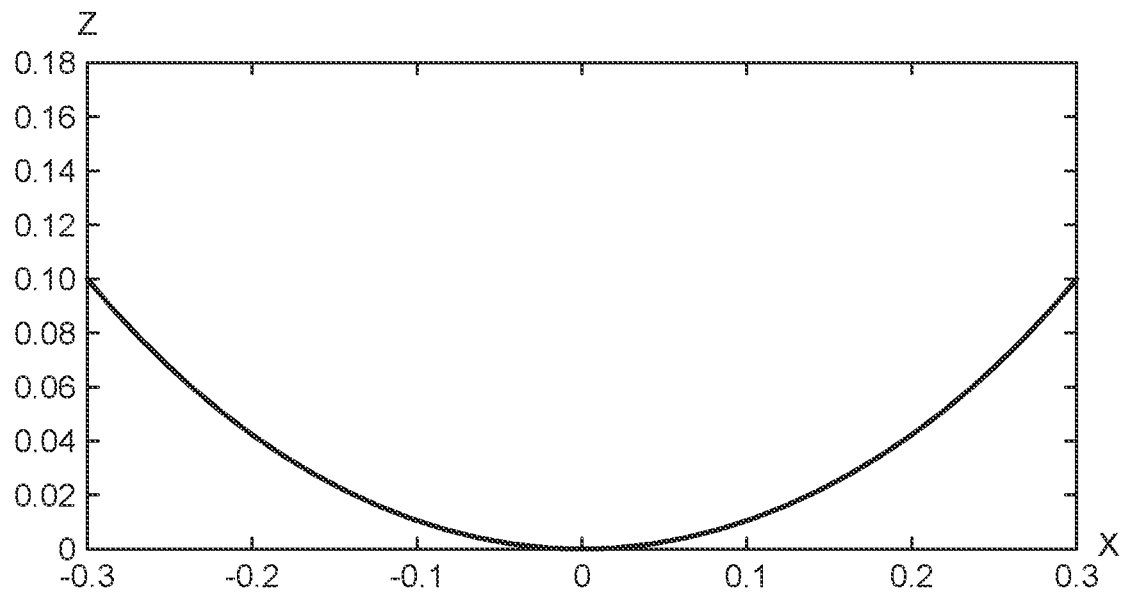
FIG. 20B shows the x-z cross section of a surface represented by Expression (7)

FIG. 20B shows the x-z cross section of a surface represented by Expression (7). The horizontal axis of FIG. 20B represents x, and the vertical axis of FIG. 20B represents z. The unit of the horizontal axis and the vertical axis is millimeter. The shape shown in FIG. 20B is a circular arc the radius of which is 0.5 mm.

The surface of the mold represented by Expression (7) is concave and continuous and is line-symmetric with respect to the z-axis in any cross sections perpendicular to the x-axis and in any cross sections perpendicular to the y-axis. The maximum value of an angle (an acute angle) formed by a tangential line on the contour of the x-z cross section shown in FIG. 20B and the x-axis is 36.87 degrees, and the radius curvature at the point where the maximum value is obtained is 0.5 mm. On the other hand, according to Table 1 an angle (an acute angle) formed by a tangential line on the contour of the y-z cross section shown in FIG. 20A at one of the points of y=±0.2 mm and the y-axis is 38.13 degrees, and the radius of curvature at the points is 0.47 mm. Further, according to Table 1 a ratio of the maximum value to the minimum value of radius of curvature of the contour of the y-z cross section shown in FIG. 20A is 0.76/0.27=2.8. Accordingly, the surface of the mold represented by Expression (7) satisfy the above-described conditions required for application of the present invention.

First, the shape of the y-z cross section is considered. The shape is identical with that defined by Expression (3) or Expression (4), and the shape of a tool, which is similar to the shape of the y-z cross section can be defined by Expression (5) or Expression (6) containing a coefficient A. Further, in the y-z cross section, a pitch (an interval in the radial direction between the tool path) shown in FIG. 9 on the surface of the mold can be determined according to the method described with FIG. 13 and FIG. 14.

Then, the shape of the x-z cross section is considered. The shape of the cross section of the mold and the shape of the cross section of the end mill are different for each other. In the x-z cross section, a point on the surface of the mold is machined by a portion of the blade of the end mill, the angle of the tangential line at the portion being equal to the angle of the tangential line at the point. In order to calculate the tool path, in the x-z cross section, a radius curvature of the blade of the end mill at a portion, the angle of the tangential line at the portion being equal to the angle of the tangential line at each point on the surface of the mold, is obtained, a pitch (an interval in the radial direction between the tool path) on the surface S of the mold is determined by the radius curvature, and points corresponding to the tool path are obtained. Further, coordinates of the reference point of the end mill for the above-described points are calculated.

Figure 21:
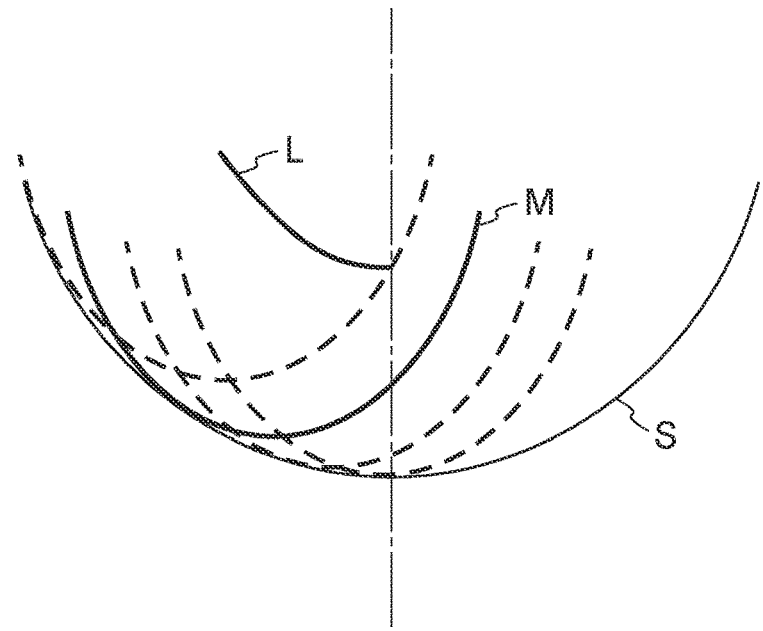
FIG. 21 illustrates a position of the reference point of the end mill in the x-z cross section.

FIG. 21 illustrates a position of the reference point of the end mill in the x-z cross section. In FIG. 21, the central axis of the mold is represented by a chain line. In FIG. 21, S represents a surface of the mold, M represents a cross section containing the central axis of the end mill, and L represents a curve on which the reference point of the end mill is located. In the x-z cross section, any two of the surface S of the mold, the cross section M containing the central axis of the end mill and the curve L on which the reference point of the end mill is located are not similar in shape to each other.

For any cross section containing the central axis (z-axis) besides the y-z cross section and the x-z cross section, a pitch (an interval in the radial direction between the tool path) can be determined, and points corresponding to the tool path can be obtained as in the case of the x-z cross section described above. In the case of the above-described cross section, however, coordinates of a point to be machined and coordinates of the reference point of the end mill are not located in a single plane, and a path of the reference point of the end mill is not a curve in the above-described cross section. In this case, the end mill is located such that the tangential plane of the surface S of the mold at a point to be machined agrees with the tangential plane of the end mill at a position used to machine the point. Specifically, the end mill is located such that the central axis of the end mill passes through the normal to the surface of the mold at the point to be machined. In this case, it is necessary that the surface of the mold and the surface of the end mill do not have a point of contact besides the point to be machined.

Thus, by obtaining sets of coordinates of the reference point of the end mill for points to be machined, i.e. points of contact of the tool in each cross section containing the central axis, and connecting the sets of coordinates with a smooth curve, a spiral path of the reference point of the end mill can be obtained.

Figure 22:
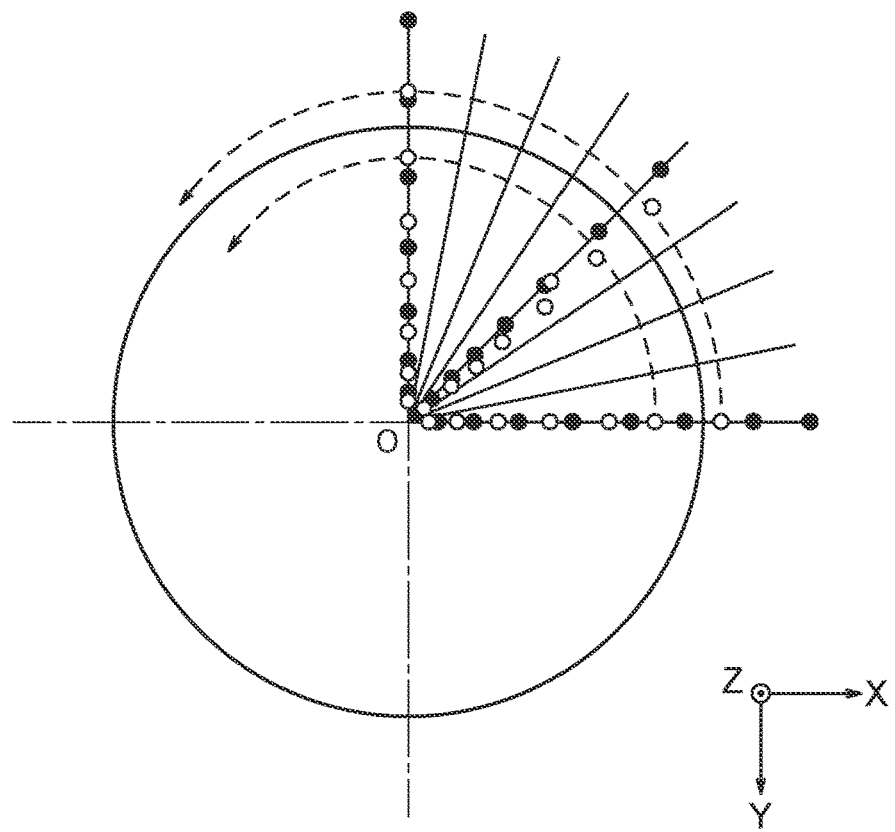
FIG. 22 illustrates how to obtain a spiral path of the reference point of the end mill when the shape of the mold is not axially symmetric with respect to the central axis.

FIG. 22 illustrates how to obtain a spiral path of the reference point of the end mill when the shape of the mold is not axially symmetric with respect to the central axis. FIG. 22 shows a view from the top of the z-axis. In FIG. 22 straight lines in the radial direction represent cross sections containing the z-axis. Black dots on a straight line represent points of contact of the tool in the cross section corresponding to the straight line, and white dots represents positions of the reference point of the end mill, each of the positions corresponding to each of the points of contact of the tool. An interval between adjacent black dots on a straight line is determined according to a target theoretical value of surface roughness. As described above, except in the y-z cross section and in the x-z cross section, white dots are not located on a straight line on which black dots lie. In other words, the reference point of the end mill represented by a white dot is not located in the plane containing the above-described straight line and the z-axis. By smoothly connecting the white dots with a curve, a spiral path of the reference point of the end mill shown by a broken line in FIG. 22 can be obtained. In FIG. 22, a circle represented by a solid line represents the periphery of a surface of the mold to be machined. The path of the reference point of the end mill is determined such that the path connecting points of contact of the tool, i.e. the tool path starts outside the above-described periphery.

As to the molds described above, a cross section containing the central axis of an area to be machined has a concave shape. The present invention is also applicable to a mold of which a portion of a cross section containing the central axis of an area to be machined has a convex shape. For the above-described mold, an end mill provided with a blade having a section of similarity and a circular act section the radius of which is equal to the maximum radius of curvature of the section of similarity is used. Such a blade has been described with FIG. 12A. A point in an area having a convex shape of the mold is machined by a portion of the end mill described below. In a cross section containing the central axis, the angle of the tangential line at the portion of the end mill is equal to the angle of the tangential line at the point of the mold. A blade having a circular act section is used in order that an area of a surface to be machined, the area including a point of inflection between an area having a concave shape and an area having a convex shape in a cross section containing the central axis, may not fail to be made smooth.

Figure 23:
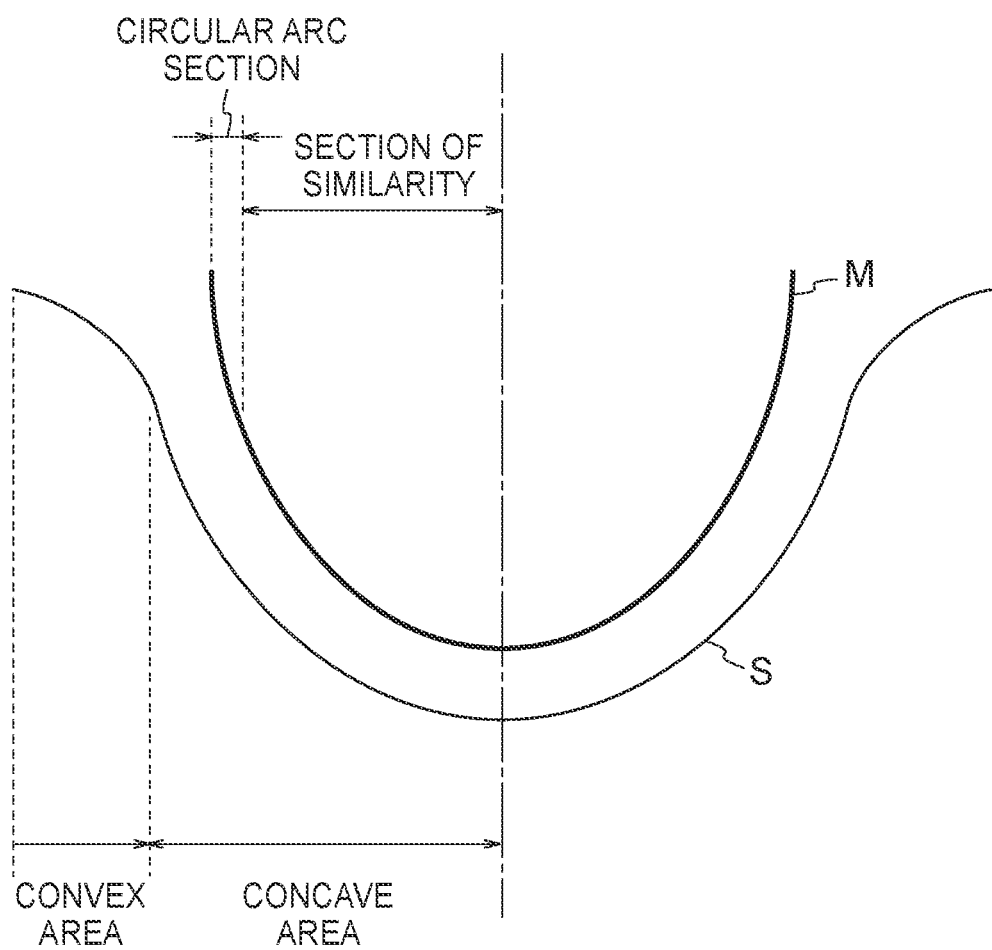
FIG. 23 illustrates how to machine a mold of which a portion of a cross section containing the central axis has a convex shape.

FIG. 23 illustrates how to machine a mold in which a portion of a cross section containing the central axis has a convex shape. In FIG. 23, the central axis of the mold is represented by a chain line. S represents a cross section containing the central axis of a surface to be machined of the mold, and M represents a cross section containing the central axis of a blade. In FIG. 23, the central axis of the surface to be machined and the central axis of the blade of the end mill agree with each other.

What is claimed:

1. A mold machining method using an end mill, wherein the mold is used for a lens, the mold has an area in which the contour of a cross section containing an axis of the mold, the axis corresponding to a central axis of the lens, is concave and continuous, a portion of the area is referred to as a first area, a ratio of the maximum value to the minimum value of radius of curvature of the contour of the first area is 2 or greater, and a blade of the end mill has a second area in which the contour of a cross section containing the axis of rotation of the end mill is geometrically similar in shape to the contour of the first area, the method comprising the steps of:

determining a spiral path of the end mill around the axis of the mold such that each point on the contour of the first area is machined by a portion of the second area, the portion of the second area corresponding to said each point on the contour of the first area, and surface roughness of the machined mold is kept at or below a predetermined value; and machining the mold with the end mill along the path.

2. The mold machining method using an end mill according to claim 1, wherein the mold is axially symmetric with respect to the axis of the mold.

3. The mold machining method using an end mill according to claim 1, wherein a ratio of similitude of the contour of the second area to the contour of the first area is 70 to 85%.

4. The mold machining method using an end mill according to claim 1, wherein a ratio of contour length of the first area to contour length of an area corresponding to an optical surface of a lens manufactured by the mold is 50% or greater.

5. The mold machining method using an end mill according to claim 1, wherein a value of radius of curvature of the contour of the second area is determined such that the value does not exceed 2.5 millimeters.

* * * * *